US011347626B2

(12) United States Patent
Cuprak

(10) Patent No.: US 11,347,626 B2
(45) Date of Patent: May 31, 2022

(54) METHOD FOR VISUALIZING OBJECTS IN COMPUTER MEMORY

(71) Applicant: Dassault Systemes Americas Corp., Waltham, MA (US)

(72) Inventor: Ryan Cuprak, Milford, CT (US)

(73) Assignee: Dassault Systemes Americas Corp., Waltham, MA (US)

( * ) Notice: Subject to any disclaimer, the term of this patent is extended or adjusted under 35 U.S.C. 154(b) by 55 days.

(21) Appl. No.: 16/730,388

(22) Filed: Dec. 30, 2019

(65) Prior Publication Data

US 2020/0210316 A1 Jul. 2, 2020

Related U.S. Application Data

(60) Provisional application No. 62/786,866, filed on Dec. 31, 2018.

(51) Int. Cl.
| | | |
|---|---|---|
| *G06F 9/44* | (2018.01) |
| *G06F 11/36* | (2006.01) |
| *G06F 16/901* | (2019.01) |
| *G06F 16/904* | (2019.01) |

(52) U.S. Cl.
CPC ........ *G06F 11/366* (2013.01); *G06F 11/3608* (2013.01); *G06F 11/3664* (2013.01); *G06F 16/904* (2019.01); *G06F 16/9024* (2019.01)

(58) Field of Classification Search
CPC .. G06F 11/366; G06F 16/904; G06F 16/9024; G06F 11/3608; G06F 11/3664
USPC .......................................................... 717/148
See application file for complete search history.

(56) References Cited

U.S. PATENT DOCUMENTS

| | | |
|---|---|---|
| 8,850,403 B2 | 9/2014 | Wintergerst et al. |
| 9,459,991 B2 | 10/2016 | Vennam et al. |
| 10,503,576 B2 | 12/2019 | Bailey et al. |
| 2020/0125238 A1* | 4/2020 | Vadapandeshwara ....................... G06F 9/465 |
| 2020/0293920 A1* | 9/2020 | Chung ..................... G06N 5/04 |

* cited by examiner

*Primary Examiner* — Chuck O Kendall
(74) *Attorney, Agent, or Firm* — Sheehan Phinney Bass & Green PA

(57) ABSTRACT

A computer-implemented method is disclosed that includes receiving content associated with a heap dump of a computer application, generating a plurality of files based on the heap dump content, and loading the files into the graph database. The files so generated are compatible with the graph database. In some implementations, additional analysis and route finding (e.g., finding the relationship between two nodes) may be performed on the resulting object graph.

25 Claims, 14 Drawing Sheets

AbstractAction
AbstractAnnotationValueVisitor6
AbstractAnnotationValueVisitor7
AbstractAnnotationValueVisitor8
AbstractBorder
AbstractButton
AbstractCellEditor
AbstractChronology
AbstractCollection
AbstractColorChooserPanel
AbstractDocument
AbstractDocument.AttributeContext
AbstractDocument.Content
AbstractDocument.ElementEdit
AbstractElementVisitor6
AbstractElementVisitor7
AbstractElementVisitor8
AbstractExecutorService
AbstractInterruptibleChannel
AbstractLayoutCache
AbstractLayoutCache.NodeDimensions
AbstractList
AbstractListModel
AbstractMap
AbstractMap.SimpleEntry
AbstractMap.SimpleImmutableEntry
AbstractMarshallerImpl
AbstractMethodError
AbstractOwnableSynchronizer
AbstractPreferences
AbstractProcessor
AbstractQueue
AbstractQueuedLongSynchronizer
AbstractQueuedSynchronizer
AbstractRegionPainter
AbstractRegionPainter.PaintContext AbstractRegionPainter.PaintContext.CacheMode
AbstractScriptEngine
AbstractSelectableChannel
AbstractSelectionKey
AbstractSelector
AbstractSequentialList
AbstractSet
AbstractSpinnerModel
AbstractTableModel
AbstractTypeVisitor6
AbstractTypeVisitor7
AbstractTypeVisitor8
AbstractUndoableEdit
AbstractUnmarshallerImpl
AbstractView
AbstractWriter
AcceptPendingException
AccessControlContext
AccessControlException
AccessController
AccessDeniedException
AccessException
Accessible
AccessibleAction
AccessibleAttributeSequence
AccessibleBundle
AccessibleComponent
AccessibleContext
AccessibleEditableText
AccessibleExtendedComponent
AccessibleExtendedTable
AccessibleExtendedText
AccessibleHyperlink
AccessibleHypertext
AccessibleIcon
AccessibleKeyBinding
AccessibleObject
AccessibleRelation

FIG. 5

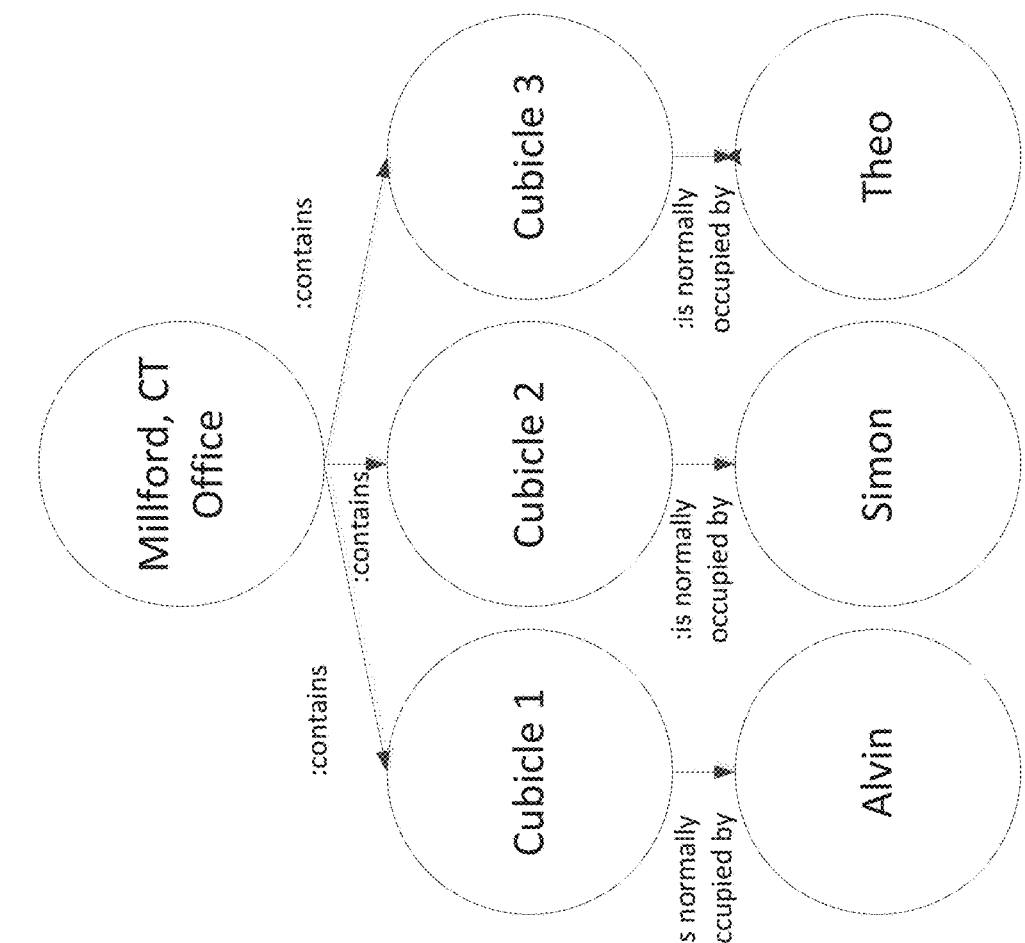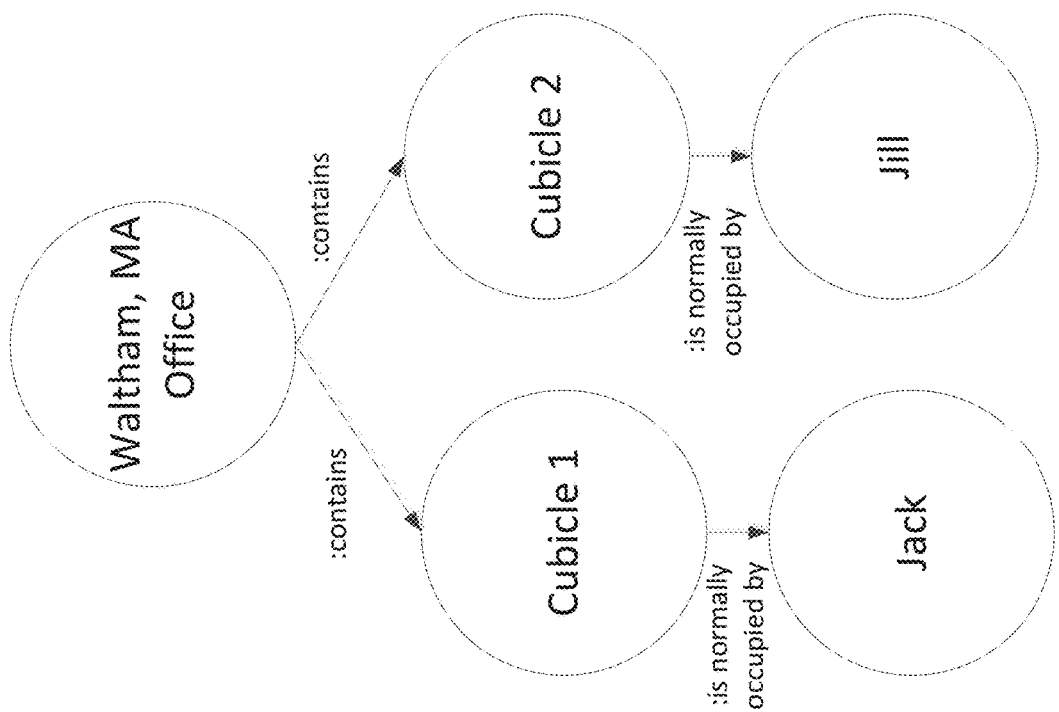
FIG. 7

METHOD FOR VISUALIZING OBJECTS IN COMPUTER MEMORY

CROSS-REFERENCE TO RELATED APPLICATION(S)

This application claims the benefit of priority to U.S. Provisional Patent Application No. 62/786,866, entitled Method for Visualizing Objects in Computer Memory, which was filed on Dec. 31, 2018, the disclosure of which incorporated by reference herein in its entirety.

FIELD OF THE INVENTION

This disclosure relates to the field of software analysis and, more particularly, relates to a method for visualizing objects in computer memory.

BACKGROUND

A heap dump is a snapshot of the memory of a Java™ process, for example. The snapshot generally contains information about all of the Java objects and classes in the heap at the moment the snapshot is triggered. Profiling tools, such as those available in the Eclipse™ Memory Analyzer (MAT), the NetBeans® profiler, the YourKit™ Java profiler, and the JProfile Java profiler from the EJ Technologies™ company provide some insight into heap dumps and some ability to analyze the contents of a heap dump. On their own, however, these tools have limited capability. Improvements are needed.

SUMMARY OF THE INVENTION

In one aspect, a computer-implemented method includes receiving content of a heap dump for a computer application, generating a plurality of files based on the heap dump content, where the files are compatible with a graph database; and loading the files into the graph database.

In a typical implementation, the computer-based method of claim 1 includes generating an object graph from the files with the graph database. This may further include displaying a visual representation of the object graph at a computer-based user interface.

The visual representation of the object graph may be a directed graph with vertices (or nodes) representing objects from the heap dump, and edges interconnecting the vertices (or nodes) and representing relationships between the vertices (nodes) from the heap dump. Moreover, the visual representation may be configured to illustrate one or more primitive properties associated with each respective one of the objects that correspond to the vertices (nodes) when a user selects that vertex (node). These primitive properties may be illustrated, for example, near a bottom portion of the screen, away from the visual representation of the corresponding object node. In some implementations, the vertices (or nodes) are color-coded based on object type.

The files may include a plurality of object files, wherein each object file is associated with a particular type of object represented in the heap dump content; and a relationship file. In certain implementations, the object files each have a template portion that identifies one or more types of properties that are applicable to the associated type of object, and a portion that identifies specific properties that correspond to the identified types of properties for each respective one of the objects of the particular object type. Moreover, in certain implementations, the relationship file identifies every relationship between objects represented in the heap dump content.

In another aspect, a computer-based system is disclosed that may perform the aforementioned processes (and others). The system may include, for example, a heap dump converter, and a graph database. The heap dump converter may be configured to receive content of a heap dump for a computer application; and generate a plurality of files based on the heap dump content, where the files are compatible with the graph database.

In some implementations, one or more of the following advantages are present.

When troubleshooting a software application that is using excessive amounts of memory it is often difficult to figure out what exactly is in memory and how is it related to what the user has done. Certain implementations provide a method for converting the memory contents of a software application into a graph representation and loading it into a graph database. Once it (the memory contents data) is loaded into a graph database, it can be queried and/or clustering and/or route algorithms can be applied to identify complex problems.

In addition, in some implementations, the contents of memory can be graphically visualized, which facilitates a more intuitive approach to troubleshooting and understanding problems and inefficiencies with particular pieces of software.

Moreover, it is worth noting that converting a Java application's "heap" (memory) space into a graph representation, as disclosed herein, is not straight-forward. First, a heap dump contains not only the Java application in question but also the language runtime. In a typical implementation, it is desirable that the runtime be separated from the application. Second, in an object oriented language not all objects are the same. In certain implementations, it may be desirable to combine some objects and object graphs into a single object or eliminate them entirely otherwise the resulting graph may be too granular to be practically useful. Third, certain data structures may need to be interpreted. For example, for a hash map, it may be desirable for the system to identify the keys and values, but disregard the internal structure of the hashmap data type. Fourth, for some objects graphs, it may be desirable to pull data up in the graph to summarize a sub-graph. Summarizing a sub-graph may enable a user to quickly see whether the sub-graph contains something of interest. It also may enable a user to query or exclude a specific sub-graph from analysis. Fifth, processing large heaps is time consuming. The data tends to be arranged sequentially in memory. For example, when processing an object, a reference to another object is an ID. To find this other object, the entire heap dump file may need to be scanned, at least until the other object is found. For gigabyte heap dumps with millions of objects it is desirable that this be done efficiently otherwise building the graph may take an unacceptably long amount of time (e.g., hours, days, weeks, even months, depending upon the complexity of the graph).

Other features and advantages will be apparent from the description and drawings, and from the claims.

BRIEF DESCRIPTION OF THE DRAWINGS

FIG. 5 is a snippet of an exemplary of list of excluded classes that a user may have prepared for use in analyzing a particular application, based on its heap dump.

FIG. 7 is an example of a directed graph.

Like reference characters refer to like elements.

DETAILED DESCRIPTION

Software programs (e.g., object oriented software programs) don't always produce the data model intended by their software developers. Moreover, as data is being manipulated within a software program, unintended object graphs may be created within an associated data model. Software applications with more complex object models tend to have a higher likelihood of producing data models that are in some erroneous relative to whatever the software developers may have intended or would have expected. Additionally, end users sometimes use software applications in either unintended or unanticipated ways, which may lead to the unintentional creation of untended object graphs in the associated data model.

Software application logic does not generally recognize or flag that its associated data model has unintended or unexpected object graphs. In many cases, even if an application's data model has unintended or expected object graphs, the application may function correctly. These applications (with unintended or unanticipated object graphs in their associated data models) generally: consume more memory than intended or anticipated, and/or leak data between object graphs.

A heap dump is a snapshot of the memory of a Java™ process, for example. The snapshot generally contains information about all of the Java objects and classes in the heap at the moment the snapshot is triggered.

Figure 1:
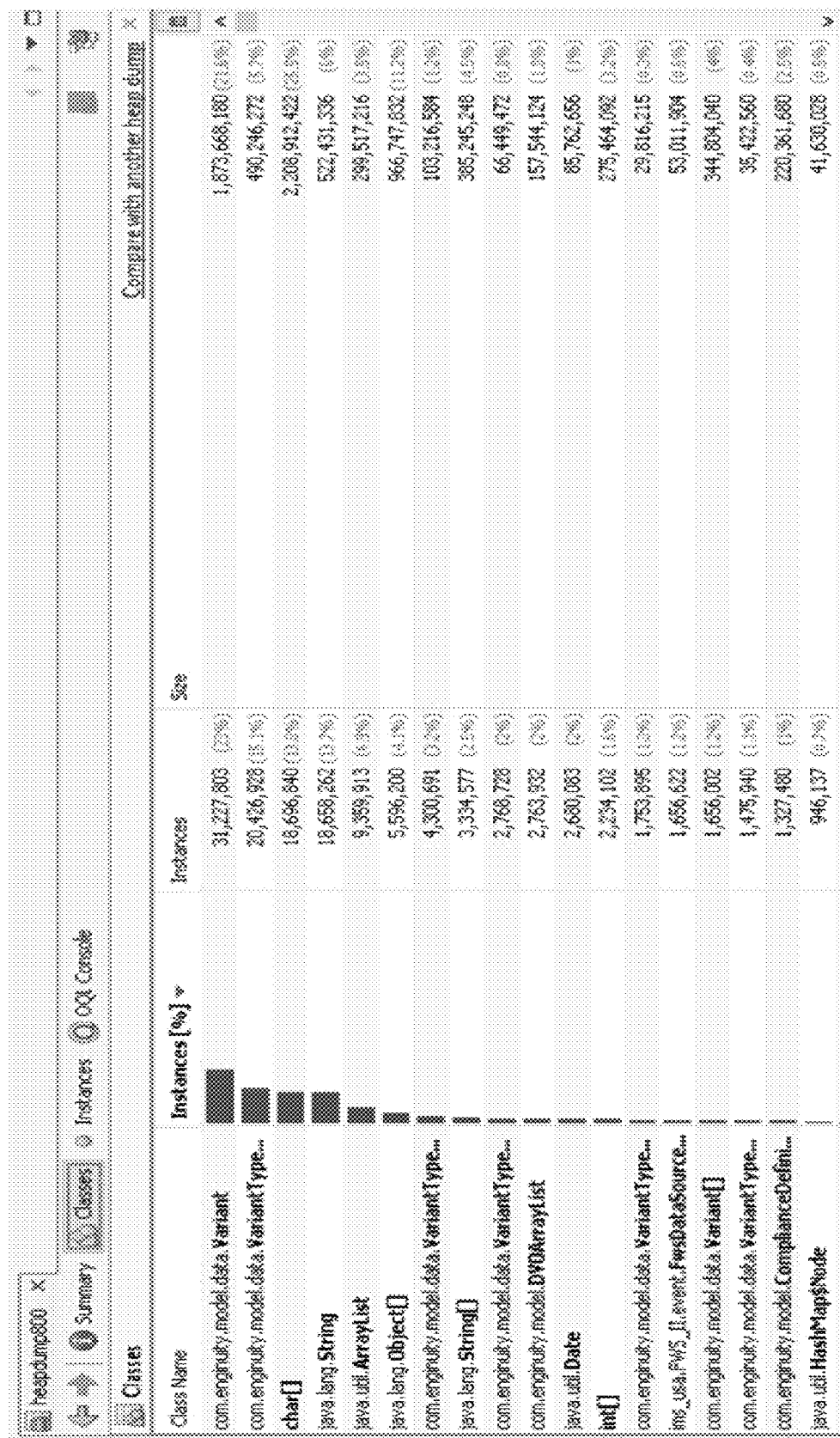
FIG. 1 is a screenshot showing an example of heap dump content in a profiler application.

FIG. 1 is a screenshot of an exemplary heap dump profiler showing an example of some of the information that might be captured in a heap dump. The illustrated screenshot shown is from the NetBeans® Heapwalker profiler and shows the information organized based on class. A class may be thought of as a user-defined blueprint or prototype, from which objects may be created or upon which objects may be based. A class generally contains a definition of the data it will contain along with method(s), if any, to operate on the data. The screenshot is organized into columns with the following headers: class name, instances (%), instances, and size. The class name column identifies the names of the various different classes of objects represented in the contents of the heap dump. For each class, the screenshot identifies the number of its instances in that class (in the instances column), the total size of all instances in that class (in the size), and a percentage value associated therewith. The listed classes are in decreasing order according to the number of instances in each class.

The screenshot also has a button that is labeled "Instances" near the top of the screen. That button, if selected, causes the heap dump profiler to show, at the computer-based user interface 214, a list of instances of each class. In this regard, the system 200, according to one implementation, shows individual instances and their respective sizes, etc.

Typically, the data in a heap dump is generated in hprof file format. This is incompatible with known graph database programs such as neo4j, MongoDB, and others. While certain views of the data can be exported to CSV, HTML and XML file formats, the heap dump itself and the relationships between the objects needs to be represented. Thus, in order to see memory heap data in a graph format, embodiments of the present invention perform the steps outlined herein.

In various embodiments, contents of a heap dump are read through an application programming interface (API) in the IDE. A heap dump converter may be used to generate files so that the data model can be loaded into a graph database. The relationships between the data entities may then be determined and visualized. In one embodiment, the Net-Beans Profiler API is used. With millions of entities in memory, trying to identify patterns manually is impossible. In certain implementations, the analyses disclosed herein can try thousands of different paths through the memory dump which would be impossible to do manually. This enables a user to identify problematic patterns in data, such as when large graphs of data are duplicated.

In various implementations, therefore, the systems and/or techniques disclosed herein facilitate analyzing the contents of a heap dump to facilitate identifying whether, and if so, how, an application's data model (represented by the heap dump contents) might diverge from either the intent or expectation of a software developer, or might be somehow less than optimal for performing the functionalities of the associated application. This sort of analysis can be highly effective to support software development, testing, and troubleshooting efforts.

Figure 2:
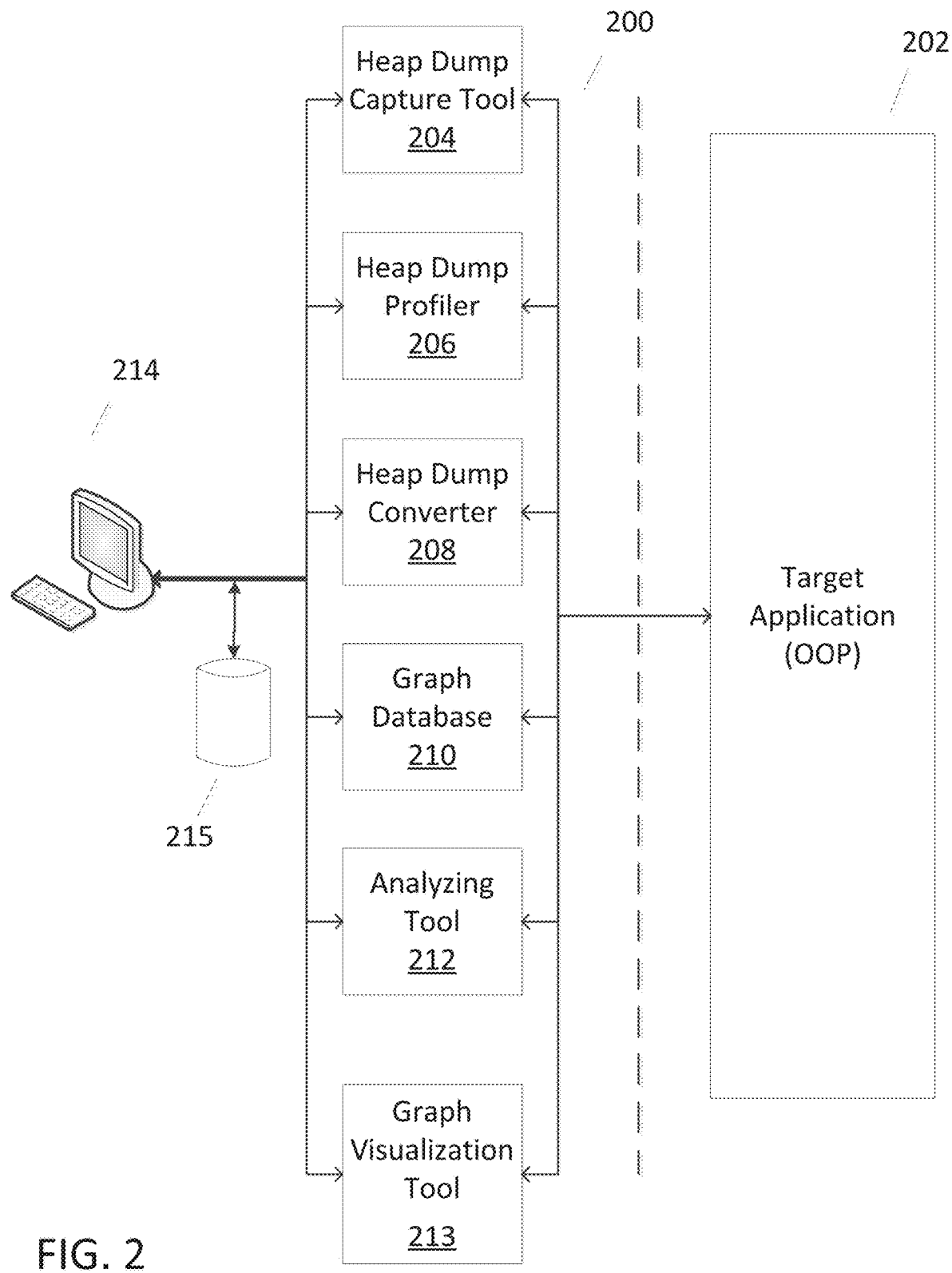
FIG. 2 is a schematic representation of a computer system configured to perform/facilitate efficient and comprehensive heap dump analysis.

FIG. 2, for example, is a partial schematic representation of an exemplary system 200 that is configured to facilitate this kind of analysis (i.e., analysis of the contents of a heap dump from a target software application 202 to identify unintended, unexpected or undesirable object graphs in the application's 202 data model, as represented in a heap dump). The target software application 202 in FIG. 2 is a Java application.

The illustrated system 200 has a number of components, including a heap dump capture tool 204, a heap dump profiler 206, a heap dump converter 208, a graph database 210, an analyzing tool 212, and a graph visualization tool 213. In a typical implementation, each of these system components may be implemented via software, stored in computer-based memory, and executed on one or more computer-based processors. The system 200 also has a computer-based user interface 214 that enables human users to access and interact with the various functionalities discussed herein as being attributable to the system 200. The computer-based memory and the one or more computer-based processors can be within the computer-based user interface 214 or elsewhere in the system 200 but accessible from the computer-based user interface device 214.

The heap dump capture tool 204 can be virtually any kind of computer provision that enables the user to generate or capture a heap dump associated with a software application (e.g., the target software application 202). The user is able to access this tool's functionalities, as well as all other user-facing functionalities associated with the system 200, from the computer-based user interface (e.g., 214 in FIG. 2).

There are a variety of ways to generate a heap dump and, therefore, a variety of ways to implement the heap dump capture tool. For example, the heap dump may be captured through a command line parameter (−XX+HeapDump-OnOutOfMemoryError) such that if there is an out of memory exception, the dump will happen automatically. There are also command line options (jmap-dump:format=b, file=dump.hprof<pid., jhsdb jmap -binaryheap --pid <pid>, jcmd <pid> GC.heap_dump <file name>) that could be used to generate a heap dump. Alternatively, a user may be able to trigger a heap dump by pressing some combination of keys (e.g., by pressing Ctrl-Break). In addition, a heap dump can be generated programmatically (i.e., code can be added to an application that will cause a heap dump if, for example, some particular set of conditions arise). An example of this is provided below:

The heap dump converter 208 includes one or more computer-based tools that perform or facilitate one or more of the processes (i.e., conversion) described herein as being attributable to the heap dump converter 208. In general, the heap dump conversion process starts with the raw heap dump content (typically in an hprof format) and produces or generates one or more files (e.g., csv files) that represent the heap dump content in a manner that can be loaded into a graph database (e.g., the Neo4j® graph database) to produce an intuitive, highly usable, visual representation of a directed graph showing various aspects of the heap dump content (e.g., at the computer-based user interface 214). In general, a csv file is a delimited text file that uses commas to separate values within the file. In a typical implementation, each line in a csv file is considered a data record and each data record generally consist of one or more fields, separated by commas. A csv file, therefore, is well-suited to store tabular data (numbers and text), such as tabular data generally produced in a heap dump, in a plain format, in which case each line may have the same number of fields. Some file types that may be considered similar to csv and that may be used in this regard, too, include other closely related delimiter-separated formats that use different field delimiters, for example, semicolons, tabs, or spaces.

Conveniently, the resulting directed graph can be easily analyzed with graph operations in a graph query language, such as Cypher®. There are a variety of ways that the heap

```
private static final String HOTSTPOT_BEAN_NAME = "com.sun.management:type=HotSpotDiagnostic";
private static volatile HotSpotDiagnosticMXBean hotSpotDiagnosticMXBean;

public static void dumpHeap(String filename, boolean live) throws IOException {
   initHotspotMBean( );
   hotSpotDiagnosticMXBean.dumpHeap(file, live);
} private static void initHotspotMBean( ) throws IOException {
   if(hotSpotDiagnosticMXBean = null) {
      synchronized (HeapDumper.class) {
         hotSpotDiagnosticMXBean = getHotSpotDiagnosticMXBean( );
      }
   }
}
private static HotSpotDiagnosticMXBean getHotSpotDiagnosticMXBean( ) throws IOException {
   MBeanServer server = ManagementFactory.getPlatformMBeanServer( );
   return ManagementFactory.newPlatformMXBeanProxy(server,HOTSTPOT_BEAN_NAME,
      HotSpotDiagnosticMXBean.class);
}
```

Alternatively, the heap dump can be generated utilizing Java Management Extensions (or JMX). JMX is a Java technology that supplies tools to facilitate managing and monitoring applications, system objects, devices, and service-oriented networks. These are just a few examples. The heap dump capture tool 204 may be implemented in a number of other different ways.

The heap dump profiler 206 is a computer-based tool that has certain functionalities associated with analyzing and displaying information about a heap dump. Some of the information that the heap dump profiler 206 may display can includes, for example, a list of classes in the heap dump, a list of instances of each class, fields for each instance or class, and/or references to instances of object types. There are a variety of ways that the heap dump profiler 206 may be implemented. Some examples of heap dump profilers 206 include those available in the Eclipse™ Memory Analyzer (MAT), the NetBeans® profiler, the YourKit™ Java profiler, and the JProfile™ Java profiler. Other options may be feasible as well.

dump converter 208 may be implemented. In some implementations, the heap dump converter 208 is implemented by software, stored in memory, and executed on one or more computer-based processors within the system 200.

The graph database 210 is a computer-based database that stores data from the heap dump and produces a graph representation of the data in the form of a directed graph, also referred to as an object graph. In a typical implementation, the directed graph has vertices (or nodes) representing objects, and edges (typically, labeled) interconnecting the vertices (or nodes) and representing relationships between the vertices (nodes). There are a variety of ways of implementing the graph database 210. In general terms, the graph database 210 is implemented by software, stored in memory, and executed on one or more computer-based processors within the system 200. Some specific examples of the graph database 210 include those available in the Neo4j® graph database management system, the Amazon Neptune® graph database service, the Infinitegraph® computer program, the OrientDB™ database management system, the Sqrrl® database management software system, and others. The graph created by the graph database can be queried using a graph query language that facilitates querying the object graph. Some examples of graph query languages include the Cypher® graph query language (which is generally compatible with the Neo4j® graph database management system), the Gremlin™ query language (which is generally compatible with the Amazon Neptune® graph database service), the SPARQL Server® database management software (which is generally compatible with the Amazon Neptune® graph database service), and others. Other options may be feasible as well.

The analyzing tool 212 is a computer-based tool that enables users to perform tasks on the graph representation, such as efficiently finding paths through the graph from a first node to a second node in an object graph. There are a variety of ways of implementing the analyzing tool 212. In general terms, the analyzing tool 212 is implemented by software, stored in memory, and executed on one or more computer-based processors within the system 200.

The graph visualization tool 213 is a computer-based tool that facilitates viewing custom graphs that are based on the results of queries made with the analyzing tool 212. For example, if the analyzing tool 212 is used to find a path between two particular vertices in a particular object graph, then the graph visualization tool 213 may be configured to produce a graph showing that path (with all of its associated vertices and edges) for display on the computer-based user interface 214. There are a variety of ways of implementing the graph visualization tool 213. In general terms, the graph visualization tool 213 is implemented by software, stored in memory, and executed on one or more computer-based processors within the system 200. In one exemplary implementation, the graph visualization tool 213 is implemented utilizing GraphViz® graph visualization software.

The illustrated system 200 also includes computer-based memory resources 215 (e.g., one or more memory storage devices) that store the various software components required to perform and/or support the various system 200 functionalities disclosed herein. In addition, the computer-based memory resources 215 are configured to store various data, including the content of the heap dump (e.g., object properties, relationships, etc.) itself and other sets of data or information referred to herein.

Figure 3:
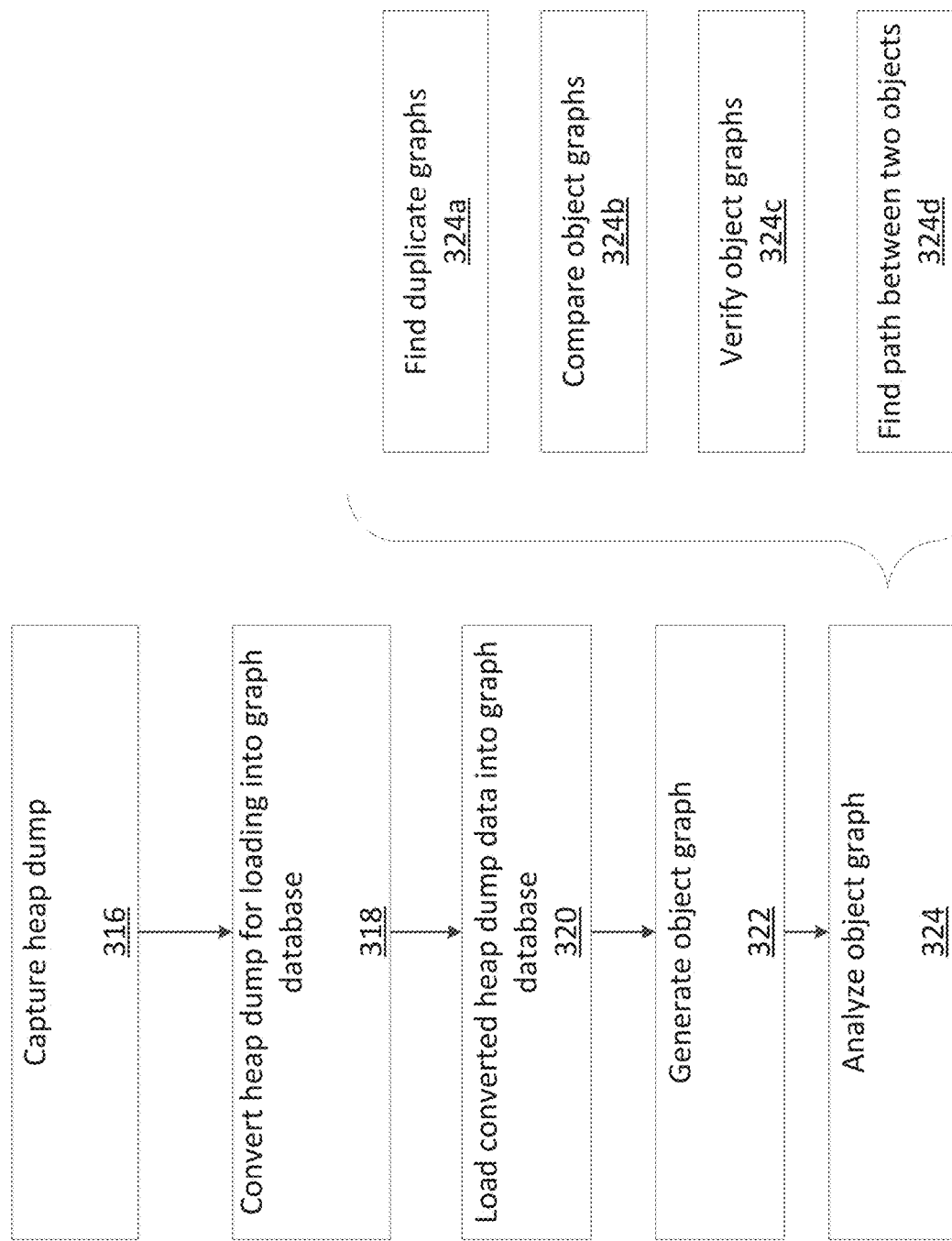
FIG. 3 is a flowchart of a process for analyzing a target software application by analyzing a heap dump from the software application.

FIG. 3 is a flowchart representing a process that may be performed by, or in conjunction with the system 200 of FIG. 2, for analyzing an application (e.g., target application 202) based on its heap content.

The illustrated process includes capturing a heap dump (at 316), converting the heap dump for loading into a graph database (at 318), loading the converted heap dump data into the graph database (at 320), generating an object graph based on the converted heap dump data (at 322), and analyzing the object graph (at 324). Analyzing the object graph (at 324) can include any one of a variety of different types of analyses. Some examples, which are shown in the figure, include finding duplicate graphs (324a), comparing object graphs (324b), verifying object graphs (324c), and/or finding paths between objects (324d). The user's particular concerns or interests will generally dictate which, if any, of these or other types of analyses end up being performed on a particular object graph.

The heap dump can be captured (or generated) (at 316) in any one of a variety of possible ways. The heap dump capture tool 204 will depend on which of these possibilities is implemented. Some examples, which were mentioned above, include using a command line parameter, using a command line option, pressing Ctrl-Break, or utilizing JMX. Once a heap dump has been generated, its contents, which may be in an hprof binary form, may be stored in one or more memory devices in the system's computer-based memory resources 215.

Figure 4:
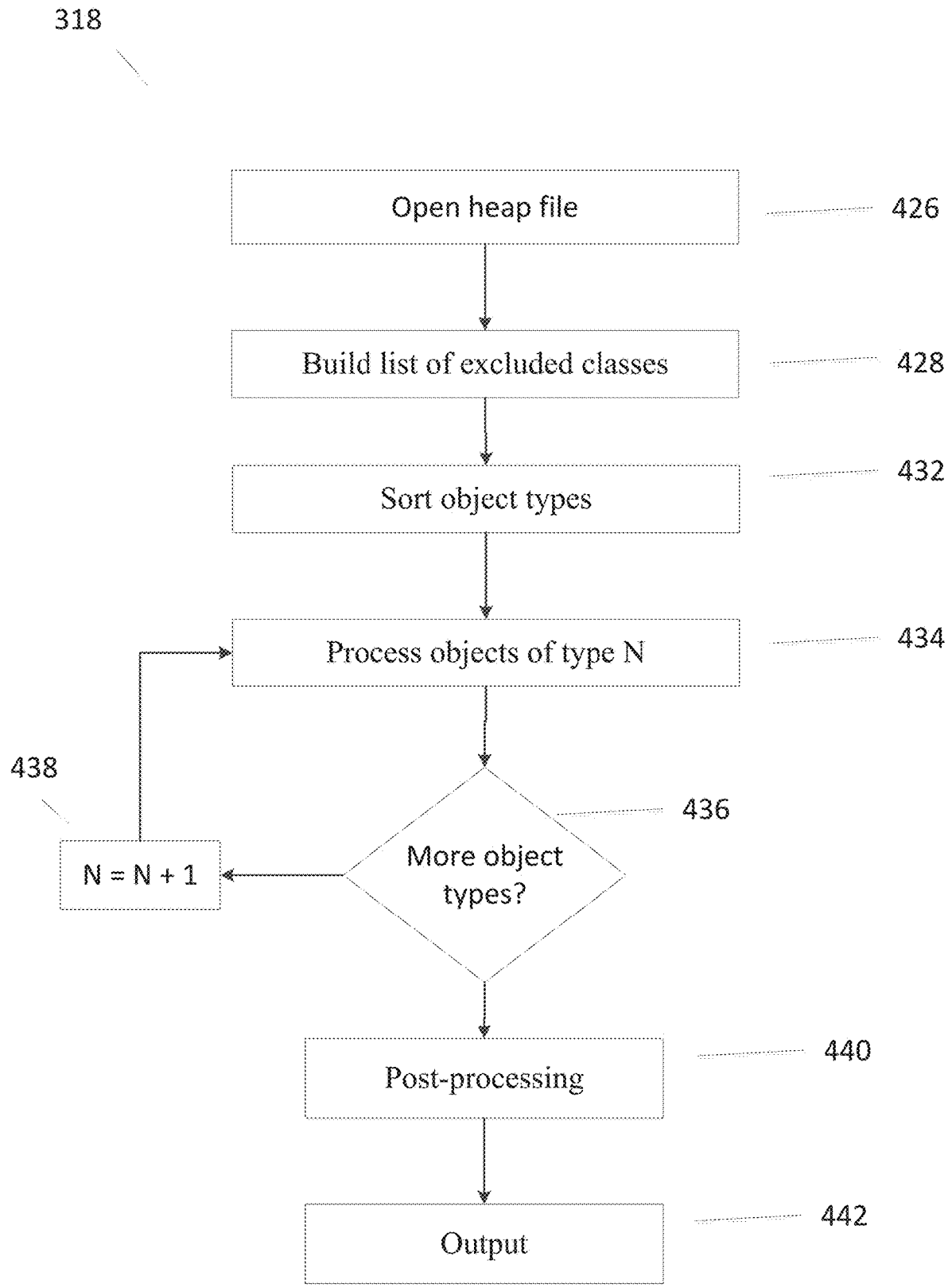
FIG. 4 is a flowchart of a process for converting heap dump content for loading into a graph database.

There are a variety of ways that the heap dump may be converted (at 318) for loading into the graph database 210. FIG. 4 is a flowchart showing one such example of this type of conversion.

In FIG. 4, the illustrated method includes opening the heap file (at 426). In an exemplary implementation, the heap file may be opened, and displayed at the computer-based user interface 214, through a program such as the NetBeans JFluid application programming interface (API) or the like.

Next, the illustrated method includes (at 428) building a list of excluded classes of objects. The list of excluded classes is a list of classes that the user does not wish to be represented in the object graph for the heap dump. There are a variety of ways that this step may be performed. In one example, the list of excluded classes can be entered manually (e.g., by a user reviewing the information displayed on the computer-based user interface 214 and creating the list in a file to be stored on the system 200). The excluded classes can vary from application to application. In general, the excluded classes include any classes that the user does not consider to be potentially relevant to perform any desired analysis of the application based on its heap dump. Typically, a user would include any internal classes (e.g., for JVM internal objects) on the list of excluded classes, because internal objects are usually not relevant to analyzing an application's performance based on its heap dump.

FIG. 5 is a snippet of an exemplary of list of excluded classes that a user may have prepared for use in analyzing a particular application, based on its heap dump.

In practice, building the list of excluded classes may be done anytime—and may extend over long periods of time. In one implementation, the user might start the list at one point in time, and then add to it over time. The list of excluded classes is stored in a computer file within the system's computer-based memory resources 215 for later reference.

Referring again to FIG. 4, next, the illustrated method includes (at 432) sorting the object types. There are a variety of ways that the object types may be sorted. In one example, the object types are sorted in such a manner that leaf objects will be processed first. A leaf object is an object in the data model that will most likely be an endpoint. Once a leaf object is identified, for example, the object types, in one implementation, are ordered according to their distance from the leaf object. Sorting the object types for processing in this manner helps facilitate efficient processing.

Next, the illustrated method includes looping over object types to process the various objects (in 434, 436, and 438). According to the illustrated implementation, starting with object type N, where N initially equals 1, each object, of type N, is processed to create files for uploading to the graph database. The overall result of looping through all of the object types (in 434, 436, and 438) is a plurality of object files (one object file for each type of object), and one relationship file (identifying all of the relationships between the various objects).

In a typical implementation, each object file includes all of the available information about objects of a corresponding object type from the heap dump that has been processed. In some implementations, each of the object files has a template portion and a portion that includes individual entries for each respective object. The template portion has a template that identifies the types of properties and/or other information associated with that type of object. The individual entries for each respective object of that type include the values for the corresponding properties (or information) of that object. In a typical implementation, each object type gets one, and only one, unique object file, and every object of that particular type gets an entry (following the template) in that object file.

In a typical implementation, there is one, and only one, relationship file created during this process. That relationship file includes a listing of all of the relationships among the different objects processed from the heap dump. There are a variety of ways that this information can be presented in the relationship file. However, in one exemplary implementation, each relationship gets its own entry (or line) in the relationship file. Moreover, each relationship is represented by a first object, a relationship type, and a second object—separated from one another by commas, for example. The objects may be represented in any convenient manner (e.g., by name or corresponding identification codes).

During this processing, each object from the heap dump ends up being processed individually to create the object files and the relationship file. In some instances, the heap dump data for one object (e.g., object N) might include a reference (e.g., a pointer) to another object (e.g., object Q), but might not include full details (or sometimes any details or information) about object Q. In those instances, the system 200 may create a new file for that other object type (object Q) or a file entry for that other object (object Q) if the object type is known, but wait to fill in additional information about that other object, until the process later reveals full (or additional) information about that other object (object Q). In the meantime, the newly-created file (or file entry) for the other object (object Q) acts as a placeholder to be filled-in at a later point in time during the heap dump processing.

The process basically loops back to continue processing objects for as long as there are unprocessed objects remaining. There are a variety of ways that the system (e.g., 200 in FIG. 2), or a user, might determine (at 436) that there are (or are not) unprocessed objects remaining. In some implementations, the system 200 might maintain a running tally of identification numbers for objects that have been processed. In those implementations, the system 200 (at 436) might simply check the running total to determine whether a particular object from the heap dump has already been processed (based on a search for the objects identification number in the running tally). In other instances, the system 200 may keep a count of how many objects have been processed and when the count reaches the number of objects provided in the heap dump, the system 200 may conclude that no other objects need to be processed.

If the system 200, or user, determines (at 436) that there are no more objects from the heap dump that need to be processed, the process moves to the post-processing step (at 440). Post-processing can include any one or more of a variety of post-processing steps. In a typical implementation, the post-processing may help facilitate later analysis of the data (e.g., in the graph database and beyond). In some implementations, the post-processing step includes reviewing the relationship file that was created (e.g., by steps 434, 436, and 438), and removing any relationships in the relationship file where one of the nodes (or identification codes) relates to an object that was on the excluded objects list (e.g., for a JVM internal object). This step can be performed in a variety of ways. According to one example, the system 200 searches for matching identification codes in the excluded objects list and in the relationship file. If a match is found, the system 200 removes the entry in the relationship file that includes the matching identification code.

Next, in the illustrated implementation, the system 200 outputs (at 442) files for loading into the graph database. In a typical implementation, the output files include a culled version (culled by the post-processing step 440) of the object files (one per object type) and the relationship file.

Referring again to FIG. 3, after converting (at 318), the illustrated process includes loading the converted heap dump data into the graph database (at 320). This entails loading both the object files (one per object type) and the relationship file into the graph database 210. From those loaded files, the graph database 210 generates the object graph representing the information in the loaded files.

FIG. 7 shows one example of a relatively simple directed graph that relates to the cubicles in two different offices of a company and the employees who normally occupy those offices. The two offices in the illustrated example are in Waltham, Mass. and Milford, Conn. According to the directed graph, the Waltham office has two cubicles: cubicle 1 and cubicle 2, whereas the Milford office has three cubicles: cubicle 1, cubicle 2, and cubicle 3. Cubicle 1 in the Waltham office is normally occupied by Jack and cubicle 2 in the Waltham office is normally occupied by Jill. Cubicle 1 in the Milford office is normally occupied by Alvin, cubicle 2 in the Milford office is normally occupied by Simon, and cubicle 3 in the Milford office is normally occupied by Theo.

Each of the vertices (or nodes) in the graph represents an object that may be represented in a corresponding Java application (e.g., the Waltham office, the Milford office, cubicle 1 in Waltham, cubicle 2 in Waltham, cubicle 3 in Waltham, cubicle 1 in Milford, cubicle 2 in Milford, cubicle 3 in Milford, Jack, Jill, Alvin, Simon, and Theo). There are three classes of objects represented in the graph: offices (the Waltham office, and the Milford office), cubicles (cubicle 1 in Waltham, cubicle 2 in Waltham, cubicle 3 in Waltham, cubicle 1 in Milford, cubicle 2 in Milford, and cubicle 3 in Milford), and people (Jack, Jill, Alvin, Simon, and Theo). The directed graph can be color-coded, for example, so that the different object types, for example, appear as different colors. Some of the edges extend from the office vertices to the associated cubicle vertices to indicate that those offices have those cubicles. Other edges extend from the cubicle vertices to the people vertices to indicate that those cubicles normally contain those people.

Once the contents of a particular heap dump have been converted into a graph representation (e.g., a directed graph) in a graph database application, the data represented in the directed graph can be analyzed and/or scrutinized either visually—on the screen of the computer-based user interface 214—in a highly intuitive manner, or by the use of user-friendly query tools, such as the Cypher® graph query language.

Figure 8:
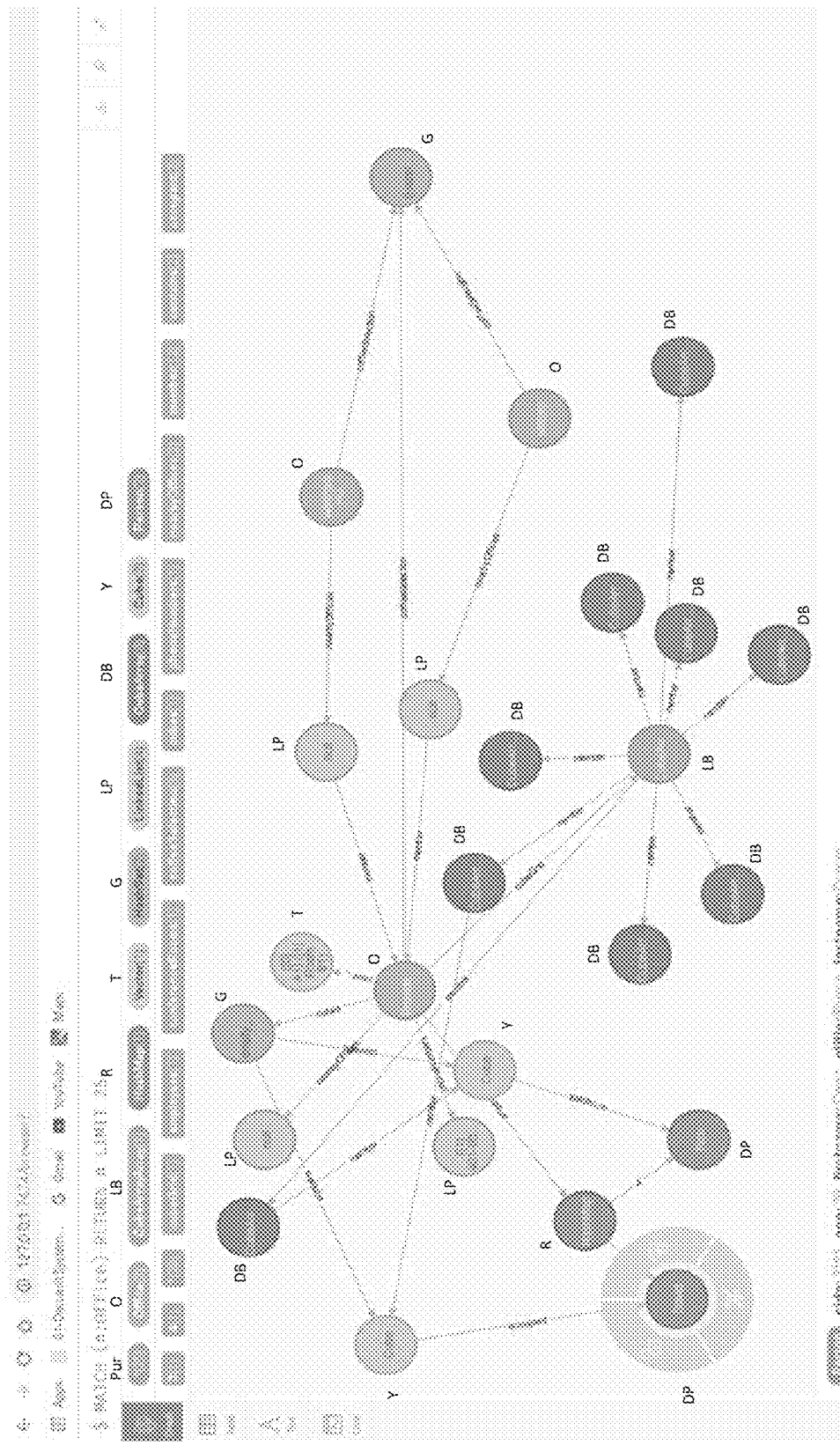
FIG. 8 is a screenshot that includes an example of a directed graph.

FIG. 8 shows an example of a screenshot from the Neo4j® graph database that includes a directed graph that might by produced by the systems disclosed herein implementing the methods disclosed herein. The illustrated graph includes information related to a company or business entity.

The graph has a plurality of vertices (or nodes), each of which represents and corresponds to a particular Java object captured in a heap dump from a target application (e.g., 202 in FIG. 1) being operated by the company. More specifically, the illustrated example includes vertices (or nodes) for three Java objects that correspond to offices (Waltham HQ, Milford, and Providence), two Java objects that correspond to cubes, two Java objects that correspond to people (e.g., Nick and David), one Java object that corresponds to a coffee selection (e.g., Hazelnut) for an office, one Java object that correspond to a collection of cube arrangements, Java objects that respectively correspond to individual cube arrangements, Java objects that correspond to null data, etc.

The vertices (or nodes), in the illustrated implementation, are color coded according to object type to facilitate ease of visually identifying and distinguishing different types of objects, as well as visually identifying different or similar patterns of interconnected vertices (or nodes). For example, in one implementation, all of the office objects (Waltham HQ, Milford, and Providence) are orange, all of the cube objects are yellow, all of the people objects (e.g., Nick and David) are dark pink, all of the coffee selection objects for an office (e.g., Hazelnut) are green, the collection of cube arrangements object is light blue, the individual cube arrangements objects are darker blue, null data objects are a light pink, etc.

FIG. 8 includes abbreviations to identify colors. The abbreviations appear next to each pill-shaped element near the top of the screen and next to each vertex to identify the color of the associated pill-shaped element and vertex. The abbreviations are as follows: PUR=Purple, O=Orange, LB=Light Blue, R=Red, T=Tan, G=Green, LP=Light Pink, DB=Dark Blue, Y=Yellow, and DP=Dark Pink. In a real world implementation, the abbreviations would not appear on the screen, but the corresponding pill-shaped elements and vertices would be color-coded according to the colors indicated by the associated abbreviations. A similar coloring scheme is used in FIGS. 9 and 11 discussed herein.

In a typical implementation, the one or more (or all) of the vertices (or nodes) in the graph representation has one or more associated primitive properties. These primitive properties are associated with the real world items that the associated Java objects represent. Some examples of primitive properties include characters, integers, floating-point numbers, fixed-point numbers, Boolean logic values (true and false), references, strings, etc.

In a typical implementation, the graph database is operable to identify primitive properties (e.g., at the bottom of the screen) for a particular object if/when a user (at computer-based user interface 214) selects a vertex (or node) that corresponds to the associated Java object. For example, in the illustrated figure, the David object has been selected by a user. Accordingly, the graph database is displaying at the bottom left portion of the screen, primitive properties associated with David (that were loaded into the graph database with David's csv file). More particularly, in the illustrated example, the displayed primitive properties indicate that David is a person, with an identification number of 2191, his age is 20, his first name is David, he has a title of person, and his last name is Donner.

In a typical implementation, the graph database would have produced the vertices (or nodes), and the properties associated therewith, shown in the graph representation based on the csv files—typically, one for each vertex (or node)—that were loaded into the graph database.

The vertices (or nodes) in the illustrated screenshot are selectively connected to one another as an ordered pair by edges that represent relationships between the connected vertices (or nodes). More specifically, each edge points from a first vertex in the ordered pair to a second vertex in the ordered pair. Moreover, each edge has a label that identifies the relationship between the ordered pair of vertices. For example, in the illustrated example, there is a directed edge, labeled "coffee selection" that points from the Milford office vertex (or node) to the Hazelnut vertex (or node). This "coffee selection" directed edge indicates that the Milford office vertex (or node) and the Hazelnut vertex (or node) are an ordered pair and that the Milford office selected a coffee that was Hazelnut flavored.

In a typical implementation, each vertex (or node) on screen can be selected by a user (at computer-based user-interface 214) and moved to a different position on screen. When this happens, the graph database program may rearrange other vertices (or nodes) and/or edges to present a clearer configuration while maintaining all of the edges between the various vertices (or nodes).

Figure 6:
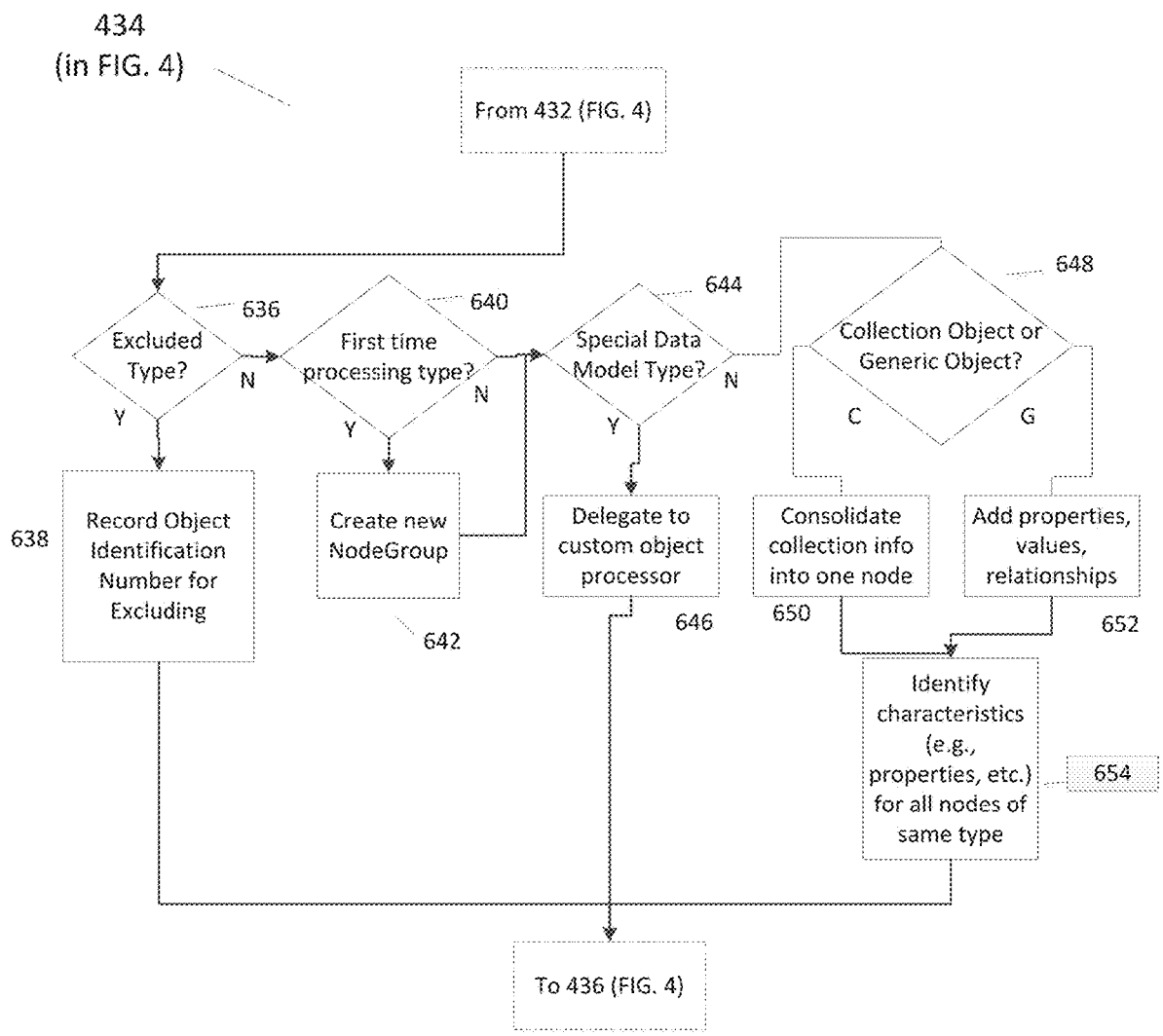
FIG. 6 is a flowchart of a process for processing an object represented in heap dump content.

Referring back again to FIG. 4, there are a variety of ways to implement the processing individual objects from the heap dump (at 434). FIG. 6 is a flowchart showing one such example.

According to the flowchart, for object N, the process includes (at 636) considering whether the object is one of the excluded classes; that is, whether the class of object N is on the excluded classes list. There are a variety of ways in which this step may be performed. According to one example, a computer-based processor in the system 200 (or a user) performs this step by comparing the class associated with object N to each entry on the excluded classes list, until a match is found. If a match is found, the computer-based processor may return an indication that the object is of an excluded class and, therefore, not to be included in the object graph that is ultimately generated. At that point, the computer-based processor records (at 638) the identification number for object N (e.g., in a file backed cache, since the number of identification numbers recorded in this matter may end up being enormous) so that the system 200 will not search for the recorded identification number subsequently.

If (at 636) there is no match identified between the class of object N and the list of excluded classes, then the conclusion may be reached that object N is not of an excluded class. In that case, according to the illustrated implementation, consideration is given (at 640) to whether the system 200 has processed an object of the same type as object N before. There are many different ways that this step may be performed. In one example, the object type for object N is compared to a list of object types that the system 200 previously processed (which may be maintained as in an ongoing manner), until a match is found. If no match is found and the entire list has been checked, then the conclusion may be reached (at 640) that it is the first time the system 200 is processing this type of object. In that case, a new NodeGroup is created (at 642). If the number of instances of the object type is large or expected to be large (e.g., greater than 1000,) then the new NodeGroup may be a FileBackedNodeGroup, otherwise the new NodeGroup may be a MemoryBackedNodeGroup.

Next, the system 200 (at 644) considers whether object N represents a special data model type. In an exemplary implementation, the plugin for the processor reports if the object N represents a special data model type. In some instances, this depends upon the data model and whether a user is trying to pull data up in the graph or cull data that he or she does not want to pollute the graph.

If the system 200 (at 644) determines that object N represents a special data model type, then the system 200 (at 646) delegates processing of object N to a custom object processor. A special data model type may be one that the user has flagged for deserving some kind of special treatment/processing. Moreover, the custom object processor may be specially configured to perform that special treatment/processing. The custom object processor then performs the special treatment/processing and the process proceeds to 436.

Next (at 648), the process includes considering whether the object is a collection type of object or a generic type of object. A collection object is a single object that includes a group of other objects. In some instances, a collection object may represent a list, an array, a hashset, etc. A generic object is one that declares one or more type variables (unqualified identifiers).

If (at 648), the object is determined to be a collection object, then the process includes (at 650) creating a node entry for the data type represented by the collection object, with edges specified to extend to each one of the entries in the collection object. Then, the information related to the entire collection is collapsed into a single node. This ensures that when a collection object is represented in the graph representation, the entire collection can be represented by one node, thus making the graph representation easier to understand and navigate.

If (at 650), the object is determined to be a generic object, then the process includes (at 652), looping over field values in the object to create or add to file entries for the object node. Primitive types and/or primitive arrays may be added as properties to the file entry for that node. Text associated with the object may be parsed and the properties or values added to the object node. Any references to other objects can be added as a relationship to a relationship file (e.g., using a program known as a relationship writer).

One of the challenges when working with a heap dump is retrieving data in a representation understood by the developer. For example, when converting the heap to a graph representation, text data is stored in a string object. However, the internal data structure of a string is typically of little or no interest, the text data is all that is needed. The following snippet of code provides a utility method that extracts meaningful contents of a string object, the text, which will be stored and represented as a property instead of as a node/object in the graph.

```
public static String convertCharArrayToString(Instance entry) {
    if(entry.getValueOfField("value") instanceof PrimitiveArrayInstance) {
        PrimitiveArrayInstance pi = (PrimitiveArrayInstance) entry.getValueOfField("value");
        if (pi != null) {
            List<Object>entries = pi.getValues( );
            StringBuilder builder = new StringBuilder( );
            for (Object obj : entries) {
                builder.append(obj.toString( ));
            }
            return builder.toString( );
        }
    } else {
        return entry.getValueOfField("value").toString( );
    }
    return "null";
}
```

The next snippet of code invokes the code snippet above for extract text data from a String. All primitive Java data types (int, double, float, Boolean, char, arrays, etc.) are added as properties and not nodes in the graph.

```
for (Value value : values) {
    FieldValue fv = (FieldValue) value;
    if(fv.getField( ).getName( ).equals("value")) {
        Object instance = fieldValue.getValueOfField(((FieldValue) value).getField( ).getName( ));
        if(instance instanceof Instance &&
        ((Instance)instance).getJavaClass( ).getName( ).equals("java.lang.String")) {
            String str = HeapUtilities.convertCharArrayToString((Instance)instance);
            if(str.trim( ).isEmpty( )) {
                instance = null; // wack it - we don't want
            }
        } else if (instance != null ){
            if(instance instanceof Double) {
                Double d = (Double)instance;
                if(d == 0) {
                    instance = null;
                }
            } else if (instance instanceof Integer) {
                Integer d = (Integer)instance;
                if(d == 0) {
                    instance = null;
                }
            } else if (instance instanceof Boolean) {
                if(!(Boolean)instance) {
                    instance = null;
                }
            }
        }
        if(fieldValue instanceof ObjectArrayInstance) {
            ObjectArrayInstance oai = (ObjectArrayInstance)fieldValue;
            int i = 0;
```

```
    for(Object obj : oai.getValues( )) {
        if(obj != null && obj instanceof Instance) {
            String label = VariantNode.getCorrectLabel(fieldValue.getInstanceId( ),i,"member");
            if(label.equalsIgnoreCase("phases")) {
                System.out.println("Node: " + node.getInstanceId( ) + " phase dvo: " + ((Instance)
obj).getInstanceId( ));
            }
            node.addReference(label,((Instance) obj).getInstanceId( ));
        } else if(obj != null) {
            System.out.println("WARNING on ObjectGraphCreator.loopOverValue: array contains
unknown object type: " + obj);
        }
        i++;
    }
}
```

After processing a given node type, the process includes (at 654) identifying the unique set of properties for all nodes of the same type. It should be noted that, for object properties that don't have a value, the dump does not contain any data. Therefore if there is a user object with a first name and last name, and last name had not been populated when the application was running, the dump representation would not mention that a "last name" property even existed and was empty.

Referring again to FIG. 4, after processing (at 434, 436, 438), the process includes a post-processing step (at 440). In one implementation, the post-processing step (440) includes reviewing the relationship file and removing any relationships where one of the nodes references an object that has been "ignored" (e.g., a JVM internal object). There are a variety of ways this step could be performed. In one exemplary implementation, the relationship file may be searched for each entry in the excluded classes list, or for identification codes that correspond to excluded classes. If a match is found, the corresponding relationship entry is deleted.

each row, or entry below the header, in the file will contain an object instance and the properties it has populated. Moreover, a relationship file will have been created that identifies every relationship found among the various objects represented in the heap dump.

Referring again to FIG. 3, these files (i.e., the object files and the relationship file) are then loaded (at 320) into the graph database (e.g., the Neo4j graph database), which converts the files into a graph representation that may be displayed, e.g., at the computer-based user interface. Once the graph database has performed this conversion, the data represented in the graph can be analyzed visually, in a highly intuitive manner and/or by using graph operations (e.g., by querying the graph using a graph query language, such as The Cypher® graph query language). The Cypher queries below are just a few examples of queries that may be made for examining a graph representation of a formulation data model.

```
Formula Ingredients - retrieve the list of ingredients in a formula.
match (:FormulaSubmitMessage)-->(f:Formula)-->(:VariantArray)-[:Phases]-
(:Variant)-[:value]-(:VariantTypeObject)-[:value]-(:DVOArrayList)-[:member]-
(p:Phase)-->(v:VariantArray)-[r:ChildIngredients]-(:Variant)-[:value]-
(:VariantTypeObject)-[:value]-(:DVOArrayList)-[:member]-(i:Ingredient)
return (p.name) , (i.commonName)
Specific Formula
(f:Formula)-->(:VariantArray)-[:Phases]-(:Variant)-[:value]-
(:VariantTypeObject)-[:value]-(:DVOArrayList)-[:member]-(p:Phase)--
>(v:VariantArray)-[r:ChildIngredients]-(:Variant)-[:value]-(:VariantTypeObject)-
[:value]-(:DVOArrayList)-[:member]-(i:Ingredient) where id(f) = 3135446
return (p.name) , (i.commonName)
Composite Formulation
match (:FormulaSubmitMessage)-->(f:Formula)-->(:VariantArray)-[:Phases]-
(:Variant)-[:value]-(:VariantTypeObject)-[:value]-(:DVOArrayList)-[:member]-
(p:Phase)-->(v:VariantArray)-[r:ChildIngredients]-(:Variant)-[:value]-
(:VariantTypeObject)-[:value]-(:DVOArrayList)-[:member]-(i:Ingredient)-
[y:m_compositeFormulation]-(x:Formula) return x
Expansion to one level
match (:FormulaSubmitMessage)-->(f:Formula)-->(:VariantArray)-[:Phases]-
(:Variant)-[:value]-(:VariantTypeObject)-[:value]-(:DVOArrayList)-[:member]-
(p:Phase)-->(v:VariantArray)-[r:ChildIngredients]-(:Variant)-[:value]-
(:VariantTypeObject)-[:value]-(:DVOArrayList)-[:member]-(i:Ingredient)-
[y:m_compositeFormulation]-(x:Formula)-->(:VariantArray)-[:Phases]-
(:Variant)-[:value]-(:VariantTypeObject)-[:value]-(:DVOArrayList)-[:member]-
(Phase)-->(:VariantArray)-[:ChildIngredients]-(:Variant)-[:value]-
(:VariantTypeObject)-[:value]-(:DVOArrayList)-[:member]-(i2:Ingredient)
return (p.name) , (i.commonName) , (i2.commonName)
```

Next (at 442), the system outputs, for the heap dump, a file for every NodeGroup that contains all object instances of the same type of object. That file will have a header containing the list of all possible properties for objects of that type, and Referring again to FIG. 3, analyzing the object graph (at 324) may include finding duplicate graphs (324a)—i.e., portions of the object graph. This functionality may find places in the object graph where a graph (i.e., some portion of the object graph) is repeated, or represented again. The analyzer tool 212 may be utilized in this regard. More specifically, the analyzer tool 212 may enable a user at the computer-based user interface 214 to enter or specify, for example, a combination of nodes and/or edges in the object graph to be checked (for duplicates). This step can be implemented in a number of different possible ways. For example, in some implementations, the user would type identification codes that correspond to the nodes of interest (and/or their edges) into a field on the interface 214. In other implementations, the analyzer tool 212 may prompt the user to select (e.g., with a mouse or other computer-based input device) the nodes (or edges) of interest on the screen of the user interface 214.

Once the nodes of interest have been provided into the analyzer tool 212 and the analyzer tool 212 has been prompted to start searching, the analyzer tool 212 may begin searching the object graph—one node at a time—for a node that has the same characteristics (e.g., identification code, etc.) as one of the nodes of interest. If one is found, then the analyzer tool 212 may determine whether the found node is connected to nodes that have the same characteristics as the other nodes of interest. In a typical implementation, the analyzer tool 212 continues this process of checking node characteristics and connections/edges/connected nodes, until the analyzer tool 212 determines that found node is part of a matching graph section or not. If not, then, the analyzer tool 212 may keep searching. If so, then, the analyzer tool 212 may flag the match (e.g., by outputting an indication of the match to a user at the user interface 214).

In a typical implementation of this process, while recursively traversing the object graph, the nodes considered may be tracked (e.g., by storing an identification code or other characteristics for that node in cache or some other memory location) so that the analyzer tool 212 keeps track of which nodes already have been considered. In those implementations, when the analyzer tool 212 reaches a new node, the analyzer tool 212 checks the tracked nodes. If the new node already has been considered (e.g., as evidenced by its identification code being present in the memory cache), then the analyzer tool 212 will adjust its traversal path, if possible, to avoid retracing that portion of the graph to try to find a matching portion of the object graph. If, on the other hand, the new node has not been considered already (e.g., is not represented in the memory cache), then the analyzer tool 212 continues along that path—which includes the new node—to try to find a matching portion of the object graph.

Analyzing the object graph (at 324) may include comparing object graphs (324*b*). For example, an object graph of a heap dump from the target application 102 at time to may be compared to an object graph of a heap dump from the target application at a later time $t_1$ to look for changes. The analyzer tool 212 may be utilized in this regard. More specifically, the analyzer tool 212 may traverse each object graph (i.e., the to object graph and the $t_1$ object graph) on a node-by-node basis, comparing characteristics and edges—to identify and flag to a user (at user interface 214)—any differences.

In a typical implementation of this process, while recursively traversing the object graphs, the nodes considered may be tracked (e.g., by storing an identification code or other characteristics for that node in cache or some other memory location) so that the analyzer tool 212 keeps track of which nodes already have been considered. In those implementations, when the analyzer tool 212 reaches a new node, the analyzer tool 212 checks the tracked nodes stored in memory. If the new node already has been considered (e.g., as evidenced by its identification code being present in the memory cache), then the analyzer tool 212 will adjust its traversal path, if possible, to avoid retracing that portion of the graph to try compare the object graphs. If, on the other hand, the new node has not been considered already (e.g., is not represented in the memory cache), then the analyzer tool 212 continues along that path—which includes the new node—to compare the graphs.

Analyzing the object graph (at 324) may include verifying an object graph (324*c*) in the object graph. The analyzer tool 212 may be utilized in this regard. Moreover, this sort of process is similar to the comparison discussed above (at 324*b*), except instead of having two graphs of the same operating application (e.g., target application 102) at different points in time, verification may include comparing an object graph of a heap dump of an operating application (e.g., target application 102) and an object graph that represents what the developer of the operating application would have expected the object graph to look like. In this regard, the developer may be prompted to specify that information, or provide information that indicates what a heap dump would be expected to look like. If the analyzer tool 212, in comparing these, identifies any differences, these can be flagged to a user (e.g., at user interface 214).

Analyzing the object graph (at 324) may include finding paths between two objects (324*d*) in the object graph. The analyzer tool 212 may be utilized in this regard. More specifically, the analyzer tool 212 may enable a user at the computer-based user interface 214 to enter or specify, for example, one source (or originating) node and one target (or destination node) in the object graph. This step can be implemented in a number of different possible ways. For example, in some implementations, the user would type identification codes that correspond to the source and target nodes into a field on the interface 214. In other implementations, the analyzer tool 212 may prompt the user to select (e.g., with a mouse or other computer-based input device) the source and target nodes on the screen of the user interface 214.

Once the source and target nodes have been provided into the analyzer tool 212 and the analyzer tool 212 has been prompted, the analyzer tool 212 generates graph data that represents a path from the source node to the target node, including all interconnecting nodes and edges. In a typical implementation of this process, while recursively traversing the object graph, the nodes considered may be tracked (e.g., by storing an identification code or other characteristics for that node in cache or some other memory location) so that the analyzer tool 212 keeps track of which nodes already have been considered. In those implementations, when the analyzer tool 212 reaches a new node, the analyzer tool 212 checks the tracked nodes. If the new node already has been considered (e.g., as evidenced by its identification code being present in the memory cache), then the analyzer tool 212 will adjust its traversal path, if possible, to avoid retracing that portion of the graph to try to find a path between the source node and the target node. If, on the other hand, the new node has not been considered already (e.g., is not represented in the memory cache), then the analyzer tool 212 continues along that path—which includes the new node—to try to find a path from the source node to the target node.

In a typical implementation, when the analyzer tool 212 has finished identifying a path from the source node to the target node, it will have created a collection of data (representing the source to destination path) that can be loaded into the graph visualization tool 213. In a typical implementation, the analyzer tool 212 does just that—loads the collection of data (representing the source to destination path) into the graph visualization tool 213. The graph visualization tool 213 then produces a graphical representation, at the computer-based user interface 214 of the source to destination path that the analyzer tool identified.

In some implementations, the output of the analyzer 102 may be a dot file, which is able to be rendered using Graphviz® graphical visualization software.

Figure 9:
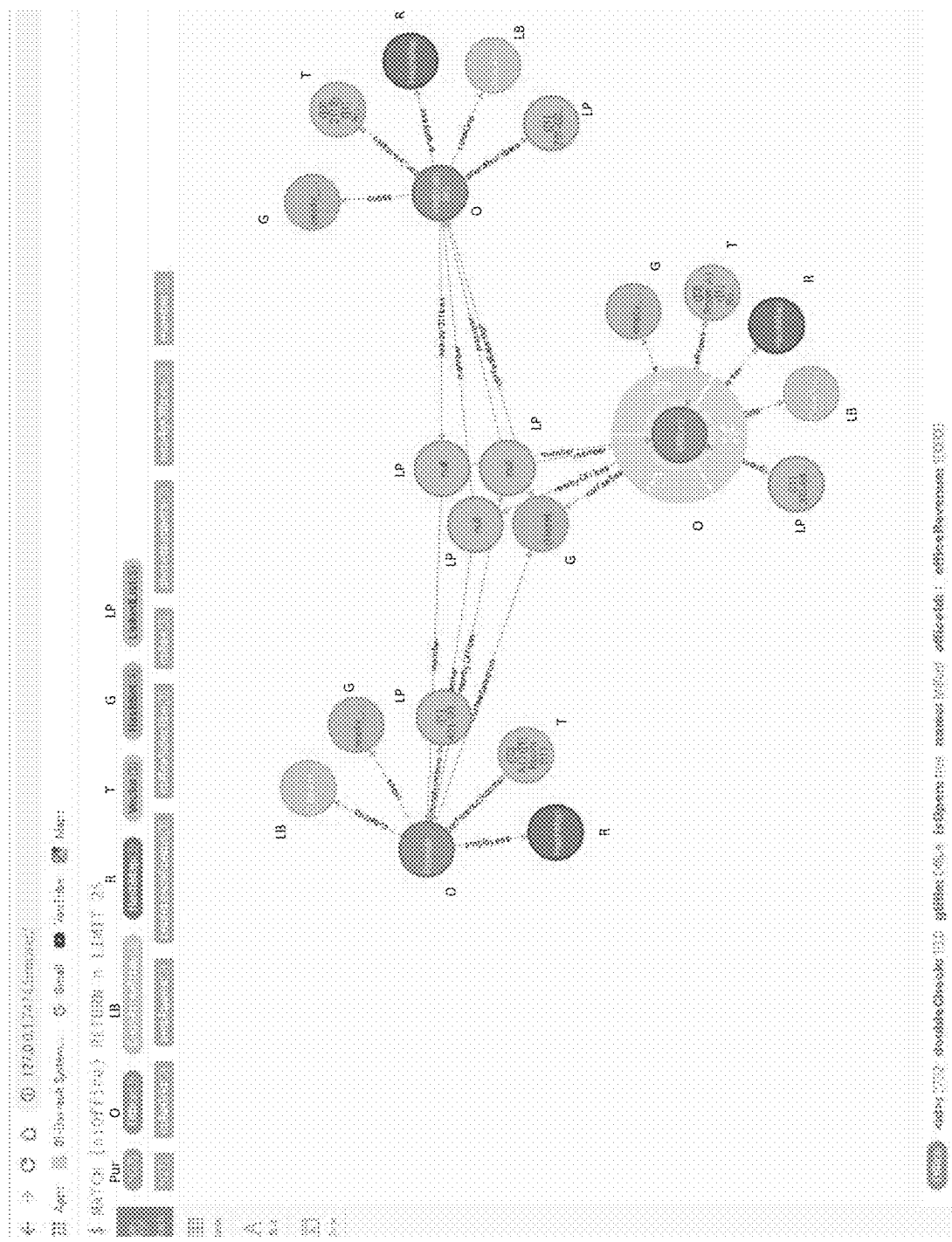
FIG. 9 is a screenshot that includes an example of a directed graph.

For demonstration purposes, a small data model is represented in FIG. 9. This data model creates a representation of an office with cubes and employees. The office contains a Map data structure of employee ID to Person objects representing the employees for an office. A cube also has a reference to the occupant which is a person object. The code sample below creates an object graph with three offices, Milford, Waltham, and Providence. Each location is populated with coffee, cubes, and employees.

```
Set<String>availableCoffee = new HashSet<>( );
availableCoffee.add("Pike's Place Roast");
availableCoffee.add("Morning Blend");
availableCoffee.add("Hazelnut");
Office milford = new Office("Milford",availableCoffee,1,100000,10,true);
milford.addConferenceRoom("Room A", "Room B", "Room C");
Office waltham = new Office("Waltham HQ",availableCoffee,2,200000,10,true);
waltham.addConferenceRoom("2113", "Room 2114"),
Office providence = new Office("Providence",availableCoffee,3,300000,10,true);
providence.addConferenceRoom("A1", "Room B1");
milford.addEmployee("1",new Person("Bob","Smith",34),1,1,"203-647-3421");
milford.addEmployee("2",new Person("John","Doe",34),1,2,"203-647-3423");
waltham.addEmployee("3",new Person("Karen","Kostner",20),1,2,"781-000-0001");
waltham.addEmployee("4",new Person("Adam","Appleton",55),5,5,"781-000-0001");
providence.addEmployee("3",new Person("David","Donner",20),1,2,"401-000-0001");
providence.addEmployee("4",new Person("Nick","Islington",55),5,5,"401-000-0002");
milford.addNearbyOffice(waltham);
milford.addNearbyOffice(providence);
waltham.addNearbyOffice(milford);
waltham.addNearbyOffice(providence);
providence.addNearbyOffice(waltham);
providence.addNearbyOffice(milford);
```

The heap for this data model can be dumped to disk, for example, and then using implementations of some of the systems/techniques disclosed herein, converted to a heap representation and loaded into a graph database (to produce a representation like in FIG. 9) from which it can be analyzed.

The graphic in FIG. 9 is a capture from the graph loaded into Neo4j. In this graphic you can see the three offices with their connections to other objects. The Milford office is selected and the properties (Java primitives) are listed on the line across the bottom. The labels on the lines are the variable names with the direction of the ownership. Not all of the nodes are expanded.

Figure 10:
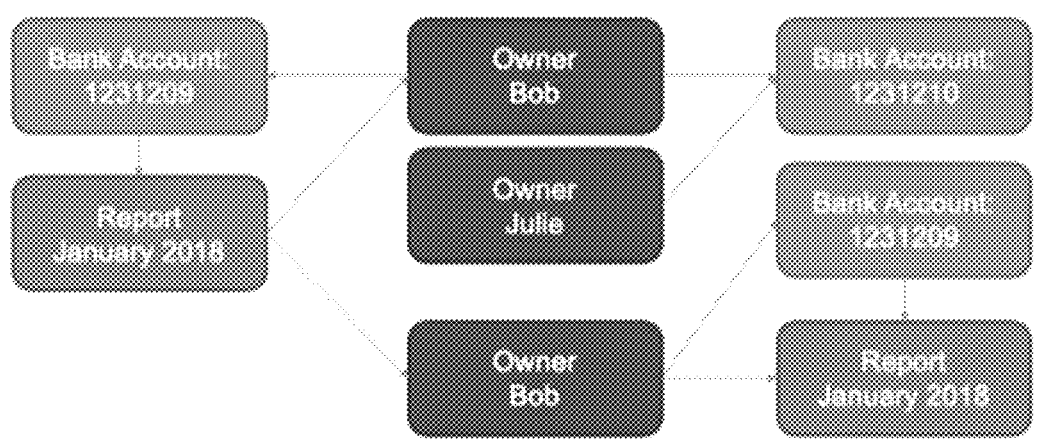
FIG. 10 is an example of an object graph.

To illustrate one type of problem that can arise in an application (e.g., target application 102) that the system and techniques disclosed herein help identify, consider the exemplary object graph in FIG. 10. This object graph is composed of three different object types:
Bank Accounts
Reports
Owners There is a bug where a report has kept a reference to account owners, one of which was duplicated with another copy of the same report. Finding bugs like these typically go unnoticed. Quality Assurance (QA) testing of the application would not normally find this type of defect as it may not be visible in the user interface. Code based testing, unit and integration testing would not normally find this type of defect either, because those test operations that would generate the right result (e.g., a report in this case), but may not even have access to, and certainly would not reveal, the duplicated data graph.

A bug like the one represented in FIG. 10 is generally only possible to identify if the contents of the application's memory space can be dumped and then visualized and/or custom queried, as disclosed herein.

The bug represented in FIG. 10 is a memory leak, but not in the traditional sense. It isn't a single type of object that has leaked but an object graph. Depending upon how the report object is handled it opens up the possibility of an unforeseen data breach or security exploit. In a typical implementation, the systems and techniques disclosed herein takes a memory dump of an application and converts it into a graph representation (nodes/edges) that is then loaded into a graph database. Moreover, in a typical implementation, utilities are provided that would iterate over the graph, and find routes between nodes in the graph and generate custom graphs. Using implementations of these systems and techniques, it is easy to find duplicate graphs (i.e., graph portions within even very complex object graphs) or errant connections to an object (for example in FIG. 9). This technique has been used to find errors in the object graph of an application. In one case, to find a duplicated graph, over 10,000 different paths through a data model were examined to find a duplicated object graph in a heap dump containing several million objects.

Figure 11:
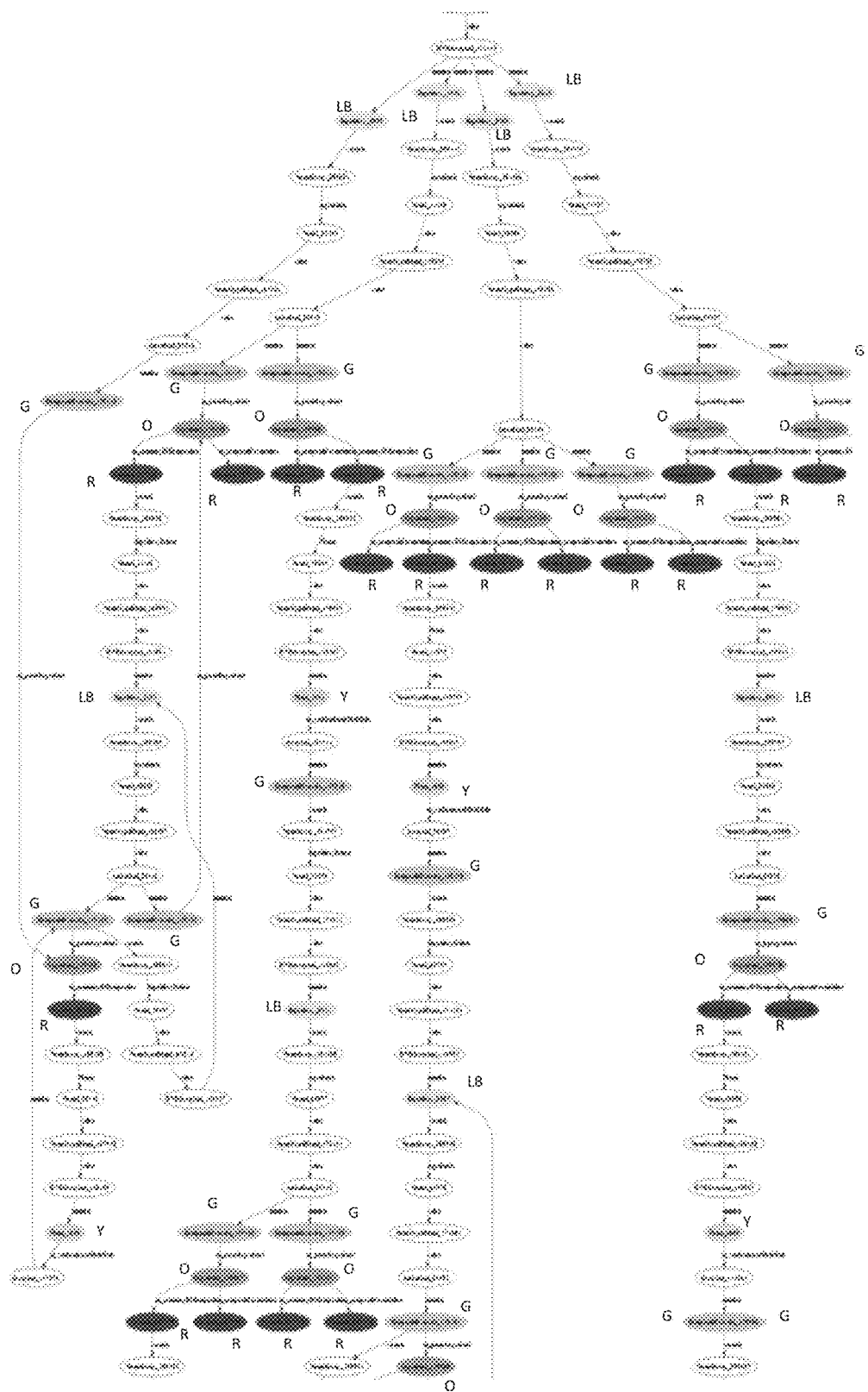
FIG. 11 is screenshot with an example of a graphical visualization of a heap dump.

FIG. 11 is an example visual representation produced (output) by at least some of the systems and techniques disclosed herein. In a typical implementation, this visual representation may be presented at user interface 214. Different types of objects are color coded so that a user can quickly see what is being represented, and the relationships between objects. This allows for interactive visualization of the memory data.

Figure 12A:
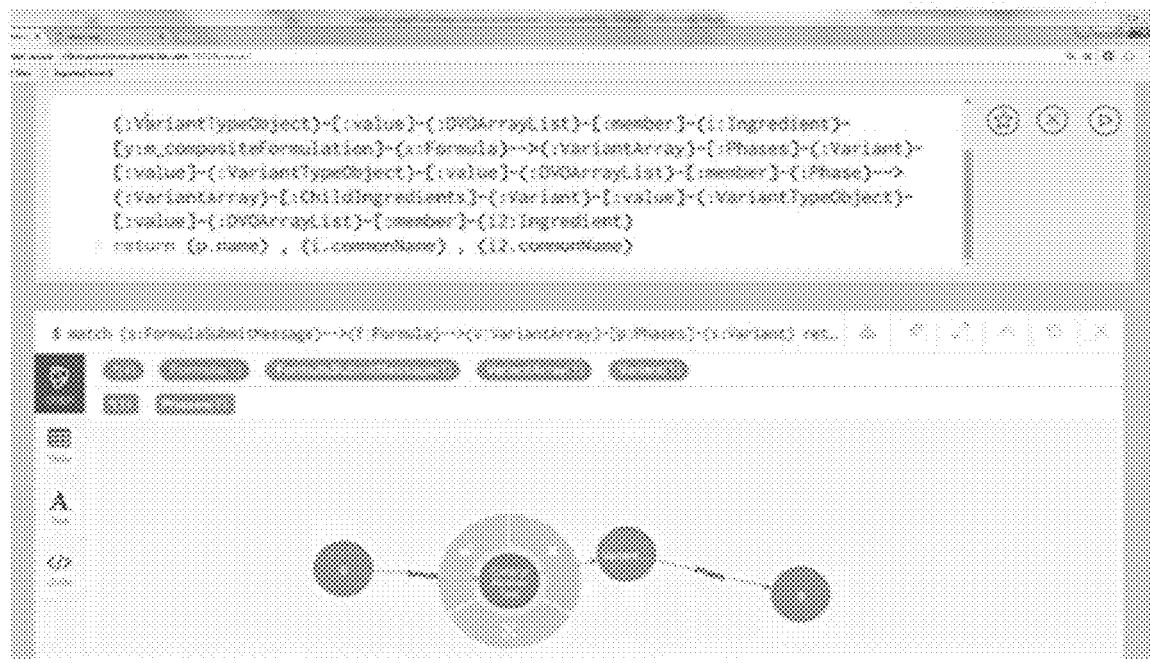
FIGS. 12A and 12B are views of an example of a user interface illustrating a query and result on a graphical visualization of a heap dump.
Figure 12B:
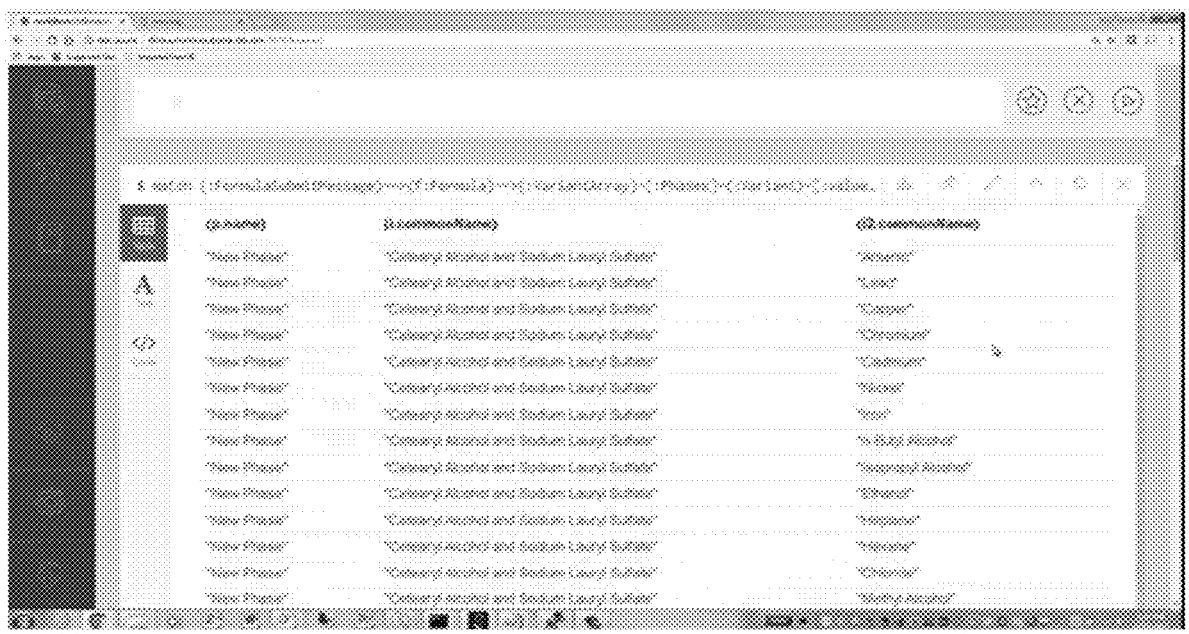

Once an object graph has been generated, more complicated queries of the data can also be made through a user interface and/or user command in various embodiments. A query can be made that has several relationship dependencies as seen in FIGS. 12a-12b depicting a user interface in one embodiment. FIG. 12a show an example of a query being made on the heap dump in the graph database, and FIG. 12b shows an example of the result of that query.

Figure 13:
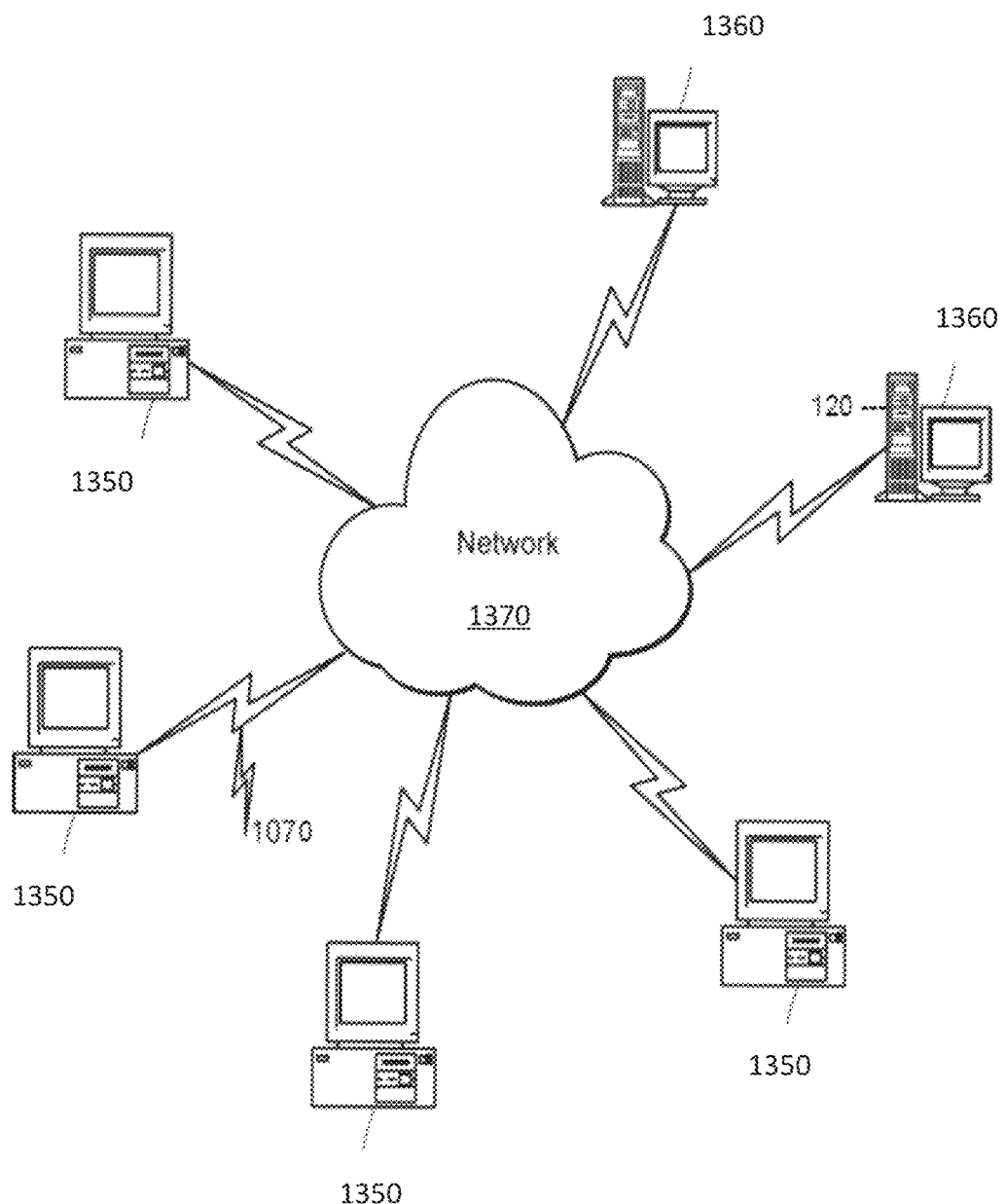
FIG. 13 is a schematic representation of a computer network or similar digital processing environment in which or with which the systems and techniques disclosed herein may be implemented.

FIG. 13 illustrates a computer network or similar digital processing environment in which embodiments of the present disclosure may be implemented.

Client computer(s)/devices 1350, and server computer(s) 1360 provide processing, storage, and input/output devices executing application programs and the like. The client computer(s)/devices 1350 can also be linked through communications network 1370 to other computing devices, including other client devices/processes 1350 and server computer(s) 1360. The communications network 1370 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Client computers/devices 1350 may be configured as, or include, the computer-based user interface 214. Server computers 1360 may be configured as engine(s) that communicate with client devices 1350 for supporting and/or implementing one or more of the various functionalities disclosed herein. The server computers 1360 may not be separate server computers but be part of a cloud network.

Figure 14:
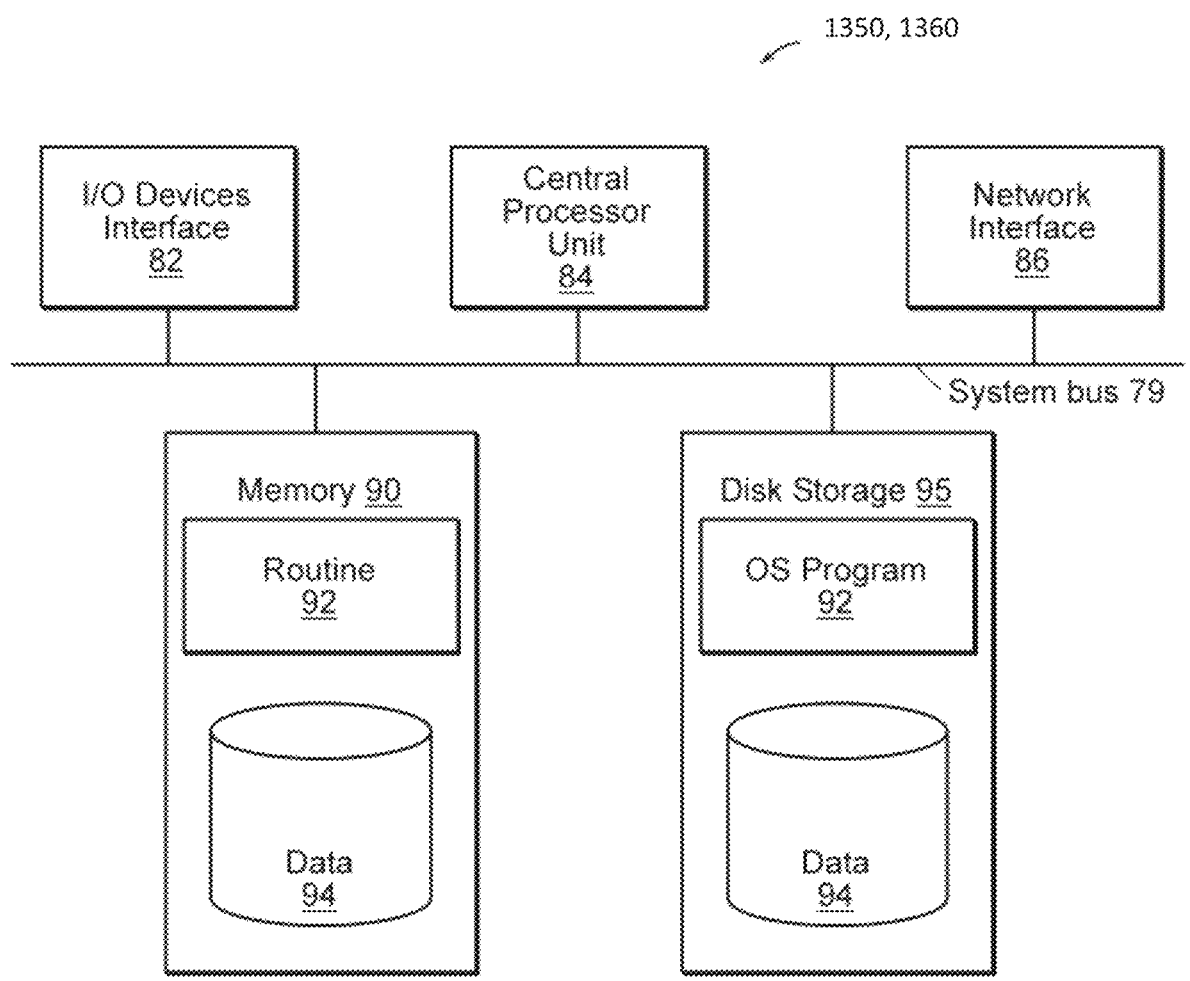
FIG. 14 is a schematic representation of an example of an internal structure of a computer (e.g., client processor/device or server computers) in the computer system of FIG. 13.

FIG. 14 is a diagram of an example internal structure of a computer (e.g., client processor/device 1350 or server computers 1360) in the computer system of FIG. 13. Each computer 1350, 1360 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 1350, 1360. A network interface 86 allows the computer to connect to various other devices attached to a network (e.g., network 1370 of FIG. 13). Memory 90 provides volatile storage for computer software instructions 92 and data 94 used to implement various embodiments of the systems and techniques disclosed herein. Disk storage 95 provides non-volatile storage for computer software instructions 92 and data 94 used to implement an embodiment of the present disclosure. A central processor unit 84 is also attached to the system bus 79 and provides for the execution of computer instructions.

A number of embodiments of the invention have been described. Nevertheless, it will be understood that various modifications may be made without departing from the spirit and scope of the invention.

For example, the systems and techniques disclosed herein can be applied to Java, but also can be used with other applications and runtimes, including, Java Script and C #.

Additionally, in certain implementations, the systems and techniques disclosed herein utilize an open source library and commercial graph database: the NetBeans Profiler API (used to reach hprof files, a binary dump of a Java application's memory spaces), and Neo4j (a graph database), where information regarding edges and nodes are loaded into Neo4j so that they can be visualized. Neo4j generally provides a programmatic API upon which further algorithms, including some disclosed herein, can be built to examine the Java applications object graph. Other options are possible.

FIG. 2 depicts the various system components as separate one. However, in some implementations, one or more of the components may be combined together.

The specific design of the various screens can, of course vary considerably from those shown and described herein. In addition, in various implementations, different features from different screens described herein may be combined to appear on the same screen. Likewise, certain features described herein as appearing on one screen could be separated into more than one different screen(s).

Any processor(s) described herein can be implemented as one or more than one processor. If implemented as more than one processor, the processors can be located in one facility or distributed across multiple locations. Likewise, any memory described herein can be implemented as one or more than one memory device. If implemented as more than one memory device, the memory devices can be located in one facility or distributed across multiple Various aspects of the subject matter disclosed herein can be implemented in digital electronic circuitry, or in computer-based software, firmware, or hardware, including the structures disclosed in this specification and/or their structural equivalents, and/or in combinations thereof. In some embodiments, the subject matter disclosed herein can be implemented in one or more computer programs, that is, one or more modules of computer program instructions, encoded on computer storage medium for execution by, or to control the operation of, one or more data processing apparatuses (e.g., processors). Alternatively, or additionally, the program instructions can be encoded on an artificially generated propagated signal, for example, a machine-generated electrical, optical, or electromagnetic signal that is generated to encode information for transmission to suitable receiver apparatus for execution by a data processing apparatus. A computer storage medium can be, or can be included within, a computer-readable storage device, a computer-readable storage substrate, a random or serial access memory array or device, or a combination thereof. While a computer storage medium should not be considered to be solely a propagated signal, a computer storage medium may be a source or destination of computer program instructions encoded in an artificially generated propagated signal. The computer storage medium can also be, or be included in, one or more separate physical components or media, for example, multiple CDs, computer disks, and/or other storage devices.

Certain operations described in this specification can be implemented as operations performed by a data processing apparatus (e.g., a processor) on data stored on one or more computer-readable storage devices or received from other sources. The term "processor" (or the like) encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be described herein as occurring in a particular order or manner, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In various implementations, a computer-readable medium computer-readable storage medium may include instructions that, when executed by a computer-based processor, cause that processor to perform or facilitate one or more (or all) of the processing and/or other functionalities disclosed herein. The phrase computer-readable medium or computer-readable storage medium is intended to include at least all mediums that are eligible for patent protection, including, for example, non-transitory storage, and, in some instances, to specifically exclude all mediums that are non-statutory in nature to the extent that the exclusion is necessary for a claim that includes the computer-readable (storage) medium to be valid. Some or all of these computer-readable storage media can be non-transitory.

This disclosure refers to the system performing various processes. In a typical implementation, these processes may be performed by one or more computer-based processors of the system, typically in cooperation with computer-based memory of the system. In some implementations, however, one or more of the processes thus described (e.g., comparing, searching, considering, etc.) may be performed by or with intervention from a human user.

Other implementations are within the scope of the claims.

What is claimed is:

1. A computer-implemented method comprising:
    receiving content of a heap dump for a computer application;
    generating a plurality of files based on the heap dump content, wherein the files are compatible with a graph database,
    wherein generating the plurality of files that are compatible with the graph database comprises excluding an object from representation in the plurality of files if the object is represented in a list of excluded classes that a user does not wish to be represented in an object graph for the heap dump;
    loading the files into the graph database;
    determining whether a particular one of the objects represented in the heap dump content corresponds to a generic object,
    if so, creating a new file for that particular type of object, or adding a file entry to an existing file for that particular type of object and
    outputting, for the heap dump, a file that contains all object instances of the same type of object, wherein the file has a header containing a list of all possible properties for objects of that type, and wherein each entry below the header in each of the files contains an object instance and the properties it has populated.

2. The computer-based method of claim 1, further comprising generating an object graph from the files with the graph database.

3. The computer-based method of claim 2, further comprising displaying a visual representation of the object graph at a computer-based user interface.

4. The computer-based method of claim 3, wherein the visual representation of the object graph comprises a directed graph comprising vertices (or nodes) representing objects from the heap dump, and edges interconnecting the vertices (or nodes) and representing relationships between the vertices (nodes) from the heap dump.

5. The computer-based method of claim 4, wherein the visual representation is configured to illustrated one or more primitive properties associated with each respective one of the objects that correspond to the vertices (nodes) when a user selects that vertex (node).

6. The computer-based method of claim 4, wherein the vertices (or nodes) are color-coded based on object type.

7. The computer-based method of claim 1, wherein the plurality of files comprises:
    a plurality of object files, wherein each object file is associated with a particular type of object represented in the heap dump content; and
    a relationship file.

8. The computer-based method of claim 7, wherein each object file comprises a template portion that identifies one or more types of properties that are applicable to the associated type of object, and a portion that identifies specific properties that correspond to the identified types of properties for each respective one of the objects of the particular object type.

9. The computer-based method of claim 7, wherein the relationship file identifies every relationship between objects represented in the heap dump content.

10. The computer-based method of claim 1, wherein the list of excluded classes comprises Java Virtual Machine (JVM) internal objects.

11. The computer-based method of claim 1, wherein generating the plurality of files compatible with the graph database comprises:
    determining, for an object represented in the heap dump, whether any objects of a same type have been processed previously, and, if not, then creating a new object file that corresponding to the type of object that is the represented object.

12. The computer-based method of claim 1, wherein generating the plurality of files compatible with the graph database comprises:
    determining whether a particular one of the objects represented in the heap dump content corresponds a collection object such that the particular object includes a collection of other objects; and if so, creating one, and only one, object file for the collection object, wherein all information related to the collection of other objects is included in the one, and only one, object file for the collection object.

13. The computer-based method of claim 1, further comprising:
entering any references to other objects that appear in the heap dump content for the generic object into a relationship file.

14. The computer-based method of claim 1, further comprising:
extracting text data from a string object, wherein the text data is to be represented in the generated files as a property in a graph.

15. The computer-based method of claim 1, wherein the heap dump is read employing an API (application programming interface).

16. The computer-based method of claim 1, further comprising, once the object graph has been generated:
analyzing the object graph to: find duplicated portions of the object graph, compare multiple versions of the object graph, verify the object graph, and/or find a path between two objects in the object graph.

17. A computer-based system comprising:
a heap dump converter; and
a graph database,
wherein the heap dump converter is configured to:
receive content of a heap dump for a computer application; and
generate a plurality of files based on the heap dump content, wherein the files are compatible with the graph database,
wherein generating the plurality of files that are compatible with the graph database comprises excluding an object from representation in the plurality of files if the object is represented in a list of excluded classes that a user does not wish to be represented in an object graph for the heap dump,
load the files into the graph database;
determine whether a particular one of the objects represented in the heap dump content corresponds to a generic object,
if so, create a new file for that particular type of object, or adding a file entry to an existing file for that particular type of object; and
output, for the heap dump, a file that contains all object instances of the same type of object, wherein the file has a header containing a list of all possible properties for objects of that type, and wherein each entry below the header in each of the files contains an object instance and the properties it has populated.

18. The computer-based system of claim 17, wherein the graph database is configured to generate an object graph from the files, and display a visual representation of the object graph at a computer-based user interface.

19. The computer-based system of claim 18, wherein the visual representation of the object graph comprises a directed graph comprising vertices (or nodes) representing objects from the heap dump, and edges interconnecting the vertices (or nodes) and representing relationships between the vertices (nodes) from the heap dump.

20. The computer-based system of claim 19, wherein the visual representation is configured to illustrated one or more primitive properties associated with each respective one of the objects that correspond to the vertices (nodes) when a user selects that vertex (node).

21. The computer-based system of claim 19, wherein the vertices (or nodes) are color-coded based on object type.

22. The computer-based system of claim 17, wherein the plurality of files comprises:
a plurality of object files, wherein each object file is associated with a particular type of object represented in the heap dump content; and
a relationship file.

23. The computer-based system of claim 22, wherein each object file comprises a template portion that identifies one or more types of properties that are applicable to the associated type of object, and a portion that identifies specific properties that correspond to the identified types of properties for each respective one of the objects of the particular object type.

24. The computer-based system of claim 22, wherein the relationship file identifies every relationship between objects represented in the heap dump content.

25. A non-transitory, computer-readable medium storing instructions executable by a processor to perform the steps comprising:
receiving content of a heap dump for a computer application;
generating a plurality of files based on the heap dump content, wherein the files are compatible with a graph database,
wherein generating the plurality of files that are compatible with the graph database comprises excluding an object from representation in the plurality of files if the object is represented in a list of excluded classes that a user does not wish to be represented in an object graph for the heap dump;
loading the files into the graph database;
determining whether a particular one of the objects represented in the heap dump content corresponds to a generic object,
if so, creating a new file for that particular type of object, or adding a file entry to an existing file for that particular type of object; and
outputting, for the heap dump, a file that contains all object instances of the same type of object, wherein the file has a header containing a list of all possible properties for objects of that type, and wherein each entry below the header in each of the files contains an object instance and the properties it has populated.

* * * * *